(12) United States Patent
Ubert et al.

(10) Patent No.: US 12,360,501 B2
(45) Date of Patent: Jul. 15, 2025

(54) PUMPING EFFICIENCY APPARATUS AND METHOD

(71) Applicant: CDM Smith Inc., Boston, MA (US)

(72) Inventors: David L. Ubert, Sorrento, FL (US); Patrick R. McCafferty, Hanover, MA (US); Janardhanan Vinoth Upendra, Chennai (IN); Zubair F. Ghafoor, Aurora, IL (US); T Sai Revanth, Jawaharnagar (IN)

(73) Assignee: CDM SMITH INC., Boston, MA (US)

( * ) Notice: Subject to any disclaimer, the term of this patent is extended or adjusted under 35 U.S.C. 154(b) by 219 days.

(21) Appl. No.: 17/715,485

(22) Filed: Apr. 7, 2022

(65) Prior Publication Data

US 2022/0326666 A1   Oct. 13, 2022

Related U.S. Application Data

(60) Provisional application No. 63/222,627, filed on Jul. 16, 2021.

(30) Foreign Application Priority Data

Apr. 8, 2021   (IN) .............................. 202141016574
Jan. 15, 2022  (IN) .............................. 202241002424

(51) Int. Cl.
*G05B 13/04* (2006.01)
*F04D 13/06* (2006.01)
(Continued)

(52) U.S. Cl.
CPC ........... *G05B 13/041* (2013.01); *F04D 13/06* (2013.01); *F04D 15/0088* (2013.01); *G05B 13/029* (2013.01); *G05B 13/048* (2013.01)

(58) Field of Classification Search
CPC ... F04D 15/0066; F04D 15/029; F04B 49/065
See application file for complete search history.

(56) References Cited

U.S. PATENT DOCUMENTS

2019/0376507 A1 * 12/2019 Vala ...................... F04B 49/065
2021/0222689 A1 *  7/2021 Kirch ..................... F04B 17/03

FOREIGN PATENT DOCUMENTS

WO   2009020402 A1    2/2009
WO   2018200845 A1   11/2018
WO   2022/217254 A1  10/2022

OTHER PUBLICATIONS

International Search Report and Written Opinion for PCT/US2022/071593 dated Jul. 12, 2022.
(Continued)

*Primary Examiner* — Kenneth J Hansen
(74) *Attorney, Agent, or Firm* — Hamilton, Brook, Smith & Reynolds, P.C.

(57) ABSTRACT

Embodiments provide functionality to control real-world mechanical systems through the creation and deployment of machine learning models. An embodiment creates the machine learning model by extracting (i) an indication of efficiency and (ii) values of operational characteristics of one or more devices from one or more characteristic curves. Each characteristic curve corresponds to a respective device of one or more devices, in a mechanical system, functioning at a given speed. A training data set is created by determining efficiency and values of the operational characteristics for the mechanical system functioning with multiple combinations of the one or more devices operating at each of a plurality of speeds using the extracted indication of efficiency and extracted values of the operational characteristics. In turn, the machine learning model is trained with the created training dataset. Training configures the machine (Continued)

learning model to predict efficiency of the mechanical system based on operating data.

14 Claims, 42 Drawing Sheets

(51) Int. Cl.
    *F04D 15/00*     (2006.01)
    *G05B 13/02*     (2006.01)

(56) References Cited

OTHER PUBLICATIONS

Coulbeck, "Optimisation and Modeling Techniques in Dynamic Control of Water Distribution of Water Distribution Systems," a thesis presented for the degree of Doctor of Philosophy in the Department of Control Engineering, University of Sheffield (Jul. 1977).
WebPlotDigitizer—Extract Data from Plots, Images and Maps; https://automeris.io/WebPlotDigitizer/; retrieved from the Internet Jul. 26, 2023.
"Control & Control History", The Wayback Macine —http://old.ieeecss.org/publications/tac/control-control-history (2018).
Ulanikci, B., et al. "Modeling the Efficiency and Power Characteristics of a Pump Group", Journal of Water Resources Planning and Management © ASCE / Jan./Feb. 2008. Downloaded from ascelibrary.org on Sep. 7, 2023.
American National Standard for Rotodynamic (Centrifugal and Vertical) Pumps—Guideline for Preferred and Allowable Operating Region (2012).

\* cited by examiner

| Training_Data_Set | |
|---|---|
| Training_Data_Set_01 | |
| ArrayN | Training_Nn |
| Nmin | |
| Nrated | |
| n | |
| ArrayNPercent | Training_Npercent |
| QBEP | |
| ArraySystemQbase | Training_Qbase |
| ArrayHfit | Training_Hfitn |
| ArrayEffit | Training_Effitn |
| Coeff | coeff |
| ArrayX | P1_EffQraw |
| ArrayY | P1_Effraw |
| A | EffA |
| Atemp | EffAtemp |
| hold | EffAold |
| Ainv | EFFAinv |
| EquationOrder | |
| TrainData | Raw_Data |
| Py_Q | Python_Q |
| Py_H | Python_H |
| Py_PC | Python_PC |
| Py_Speed | Python_Speed |
| Py_Eff | Python_Eff |
| | TrainIndex |
| Max_Arr | Training_Arr_MaxSize |
| Min_Arr | Training_Arr_MinSize |

FIG. 23

PUMPING EFFICIENCY APPARATUS AND METHOD

RELATED APPLICATIONS

This Application claims the benefit of U.S. Provisional Application No. 63/222,627 filed on Jul. 16, 2021.

This Application claims priority under 35 U.S.C. § 119 or 365 to India Application No. 202141016574, filed Apr. 8, 2021.

This Application claims priority under 35 U.S.C. § 119 or 365 to India Application No. 202241002424, filed Jan. 15, 2022.

The entire teachings of the above Applications are incorporated herein by reference.

BACKGROUND

Control systems were first developed over 2,000 years ago. In 1868, J. C. Maxwell used differential equations to describe the instabilities of a control system for a flyball governor. This accomplishment demonstrated the usefulness of mathematical models and methods in understanding complex phenomena. It also marked the beginning of using mathematical control and system theory. In the 150 years since, control systems have improved significantly by utilizing new and more complex mathematical techniques. As a result, control systems can manage sophisticated equipment and dynamic systems more precisely and with less error than ever before.

SUMMARY

While control systems have improved, no significant improvements have been made to the way motor-driven equipment and motor-driven systems are controlled in the same 150 year span. To this day, the conventional method of programming and control is integrated into control systems to regulate the behavior of motor-driven equipment and systems to achieve a desired result. When the motor is driven by a Variable Frequency Drive (VFD), the conventional method is used in conjunction with mathematical techniques to yield a desired result with precision and minimal error.

As such, improvements to controlling motor-driven equipment and motor-driven systems are needed.

The embodiments described herein provide improvements to the way motor-driven equipment and motor-driven systems connected to a VFD are controlled. Embodiments combine multiple complex mathematical techniques in a unique way to (i) extrapolate efficiency data from manufacturer equipment, e.g., pump, curves and (ii) build a complete system-efficiency dataset. Such embodiments extract data from said curves and extrapolate this extracted data to build the dataset. The dataset is used to train a model, e.g., an artificial intelligence edge device, capable of predicting real-time efficiency for any combination of equipment, e.g., pumps, running based on real-time process conditions. For instance, for a three-pump pumping system, the model is configured to predict the efficiency for operating any number of pumps, e.g., one pump running, two pumps running, and three pumps running.

Embodiments can be implanted in conventional programming and control methodologies by modifying such conventional implementations using artificial intelligence predictions so that pumps, or other such devices, are turned on or off based on a determined optimized efficient way to operate the system. The result is a motor driven system that not only achieves the desired result by varying speed based on a Proportional Integral Derivative (PID) controller speed determination, but which does so by optimizing efficiency. This novel functionality reduces energy consumption, reduces mechanical strain, and saves significant amounts of money in energy and Operations and Maintenance (O&M) costs.

One such example implementation is directed to a method that creates a machine learning model for real-world mechanical system control. One such method extracts (i) an indication of efficiency and (ii) values of operational characteristics of one or more devices from one or more characteristic curves. According to an aspect, each characteristic curve corresponds to a respective device of the one or more devices, in a mechanical system, functioning at a given speed. In turn, the method creates a training dataset by determining efficiency and values of the operational characteristics for the mechanical system functioning with multiple combinations of the one or more devices operating at each of a plurality of speeds. In an implementation, the efficiency and values are determined using the extracted indication of efficiency and extracted values of the operational characteristics. In turn, the machine learning model is trained with the created training dataset. The training configures the machine learning model to predict efficiency of the mechanical system based on operating data.

In certain aspects of the present disclosure, the operational characteristics include at least one of: head-flow (H-Q) data, best efficiency point (BEP), system flow at BEP, and rated rotations per minute (RPM).

According to an aspect, the values of the operational characteristics for the mechanical system functioning with multiple combinations of the one or more devices operating at each of a plurality of speeds are further determined using at least one of: regression analysis and one or more physics-based laws that indicate changes to the operational characteristics as a function of speed of the one or more devices. In an implementation, the one or more physics-based laws include affinity law equations. In another implementation, determining the values of the operational characteristics for the mechanical system functioning with multiple combinations of the one or more devices operating at each of a plurality of speeds using the one or more physics-based laws includes calculating coefficients for a plurality of polynomial equations by fitting the extracted values of the operational characteristics to the plurality of polynomial equations. According to such an implementation, the polynomial equations are indicated by the one or more physics based laws and, each of the plurality of polynomial equations indicates values of the operational characteristics for the mechanical system as a function of speed of the one or more devices. Moreover, in such an implementation, the calculated coefficients are used in at least a subset of the plurality of polynomial equations to determine the values of the operational characteristics for the mechanical system functioning with multiple combinations of the one or more devices operating at each of the plurality of speeds.

According to another aspect, the mechanical system is a pump or blower system driven by a variable frequency drive device. Implementations may use any machine learning modeling techniques known in the art. For instance, according to an example implementation, the machine learning model is one of: a polynomial regression model, random forest regression model, Xgboost model, and an Artificial Neural Network (ANN) model.

According to yet another aspect, the method embeds the trained machine learning model into an edge device. Such an edge device may be communicatively coupled to the mechanical system to facilitate control of the mechanical system. In another implementation, the trained machine learning model is stored in memory remotely located in relation to the mechanical system. In such an implementation, the mechanical system is communicatively coupled to the trained machine learning model so as to determine an operating scenario with optimized efficiency and operate in accordance with this scenario.

In an implementation, the trained machine learning model is configured to predict efficiency of the mechanical system during operation performed using a subset of the one or more devices in the mechanical system. Such an implementation may implement such functionality by training a plurality of machine learning models with the training dataset, wherein each machine learning model of the plurality predicts efficiency of the mechanical system based on operating data corresponding to the mechanical system operating using a respective unique subset of the one or more devices in the mechanical system.

Another implementation of the method deploys the trained machine learning model to control operation of the mechanical system. According to one such example implementation, deploying the trained machine learning model includes (i) obtaining real-time operating data for the mechanical system, (ii) processing the obtained real-time operating data with the trained machine learning model to predict efficiency of the mechanical system operating in accordance with each of a plurality of operating scenarios, (iii) based on the predicted efficiency of each of the plurality of operating scenarios, selecting a given operating scenario of the plurality, and (iv) controlling the mechanical system in accordance with the selected operating scenario. In an implementation, prior to processing the obtained real-time operating data, a format of the obtained real-time operating data is converted to a format compatible with the trained machine learning model. According to another aspect, the selected operating scenario includes at least one of: a number of devices and an indication of which devices to operate.

Another aspect of the present disclosure is directed to a computer system that includes a processor and a memory with computer code instructions stored thereon. The processor and the memory, with the computer code instructions, are configured to cause the computer system to implement any functionality or combination of functionality described herein.

Yet another aspect of the present disclosure is directed to a computer program product for creating a machine learning model for real-world mechanical system control. The computer program product comprises one or more non-transitory computer-readable storage devices and program instructions stored on at least one of the one or more storage devices. The program instructions, when loaded and executed by a processor, cause and apparatus associated with the processor to implement any functionality or combination of functionality described herein.

Another aspect of the disclosure is directed to a method of controlling a mechanical system. The method obtains real-time operating data for the mechanical system, e.g., via one or more sensors, and processes the obtained real-time operating data with a trained machine learning model to predict efficiency of the mechanical system operating in accordance with each of a plurality of operating scenarios. In an implementation, the machine learning model is configured to predict efficiency of the mechanical system based on operating data. To continue, a given operating scenario of the plurality is selected based on the predicted efficiency of each of the plurality of operating scenarios, e.g., optimize efficiency, and the mechanical system is controlled in accordance with the selected operating scenario.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 23 is an AOI for generating a training dataset in an implementation.

DETAILED DESCRIPTION

A description of example embodiments follows.

To fully understand the intricate details of embodiments described herein, it is helpful to understand the conventional method of system control in more detail. The description of FIGS. 1 through 9 below provides an overview of a conventional method of control. After FIG. 9, a detailed description of embodiments of the present disclosure and application of embodiments in an example real-world use case are explored. The example real-world use case is a pumping system comprised of three pumps that is installed at a wastewater pump station. Each pump is driven by a Variable Frequency Drive (VFD). The desired result from the control system at the pump station is to convey wastewater to the treatment plant while maintaining a constant operator-defined level setpoint in a wet well, which is a component of the pump station. Moreover, examples of step-by-step functionality of embodiments along with descriptions of how embodiments are programmed, and how embodiments can be implemented in the real world are also described.

Before beginning, it is noted that while embodiments are described herein in relation to a pump system, embodiments are not so limited. Instead, the functionality described herein can be used to extrapolate efficiency data for any desired mechanical system, create a model to predict efficiency of the mechanical system using the data, and ultimately control the system in the real world using the created model.

Conventional Method of Controlling a Pumping System

Figure 1:
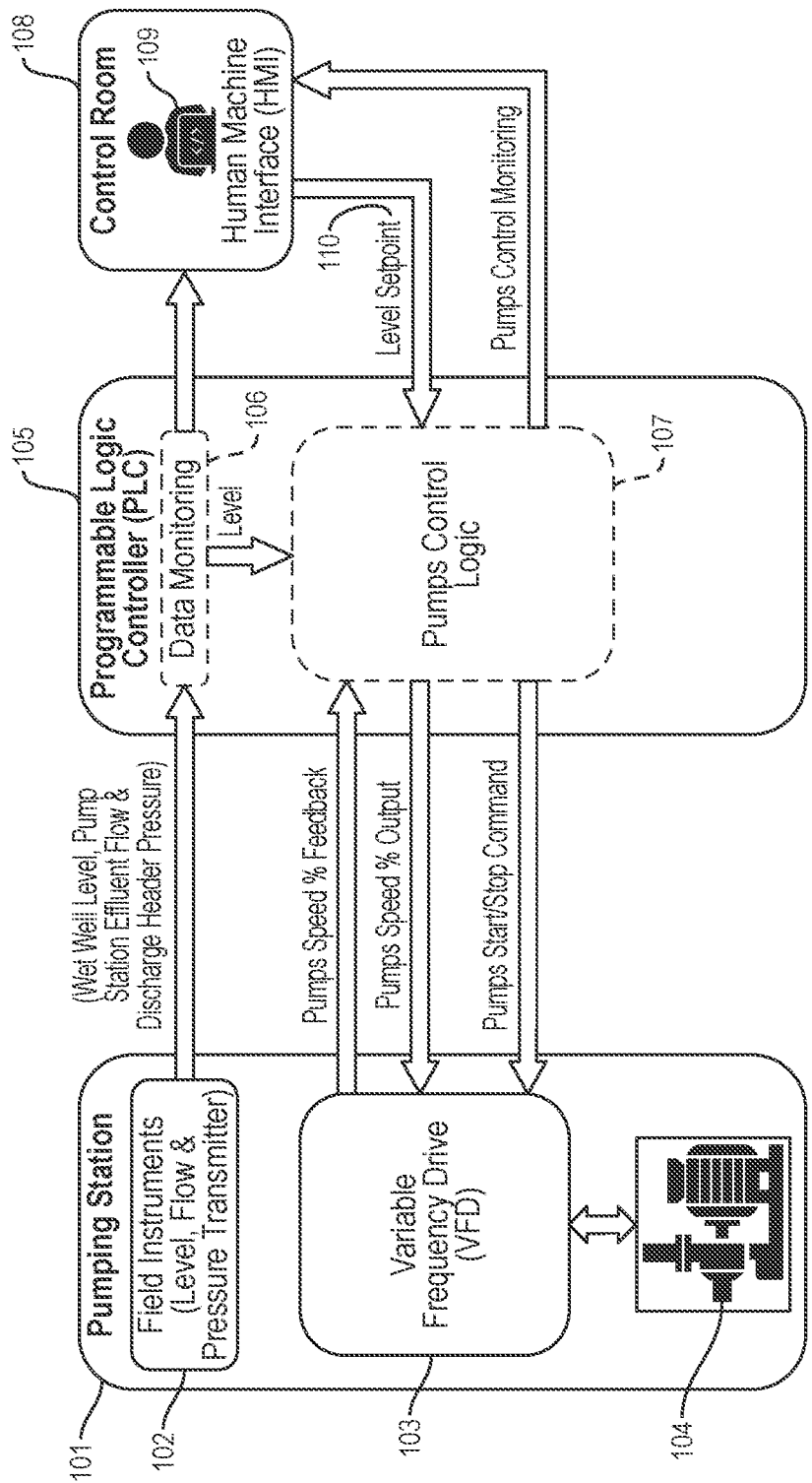
FIG. 1 is a schematic diagram of a conventional method of controlling a pumping system.

FIG. 1 is a high-level overview of a control system 100 using a conventional method of programming and control combined with mathematical techniques and system theory to achieve the desired result, level setpoint 110. The system 100 includes a pumping station 101, programmable logic controller (PLC) 105, and control room 108. The pumping station 101 includes one or more field instruments, i.e., sensors, 102, e.g., level, flow and pressure transmitter, a VFD 103, and a pump 104. The PLC 105 includes a data monitoring module 106 and pump control logic module 107. Said modules 106 and 107 may be implemented using any combination of hardware and software as is known in the art. Further, the control room 108 includes a human machine interface (HMI) 109.

In operation, the system 100 implements a typical control strategy for maintaining an operator-defined level setpoint 110. The operator-defined level setpoint 110 can be any setpoint needed to achieve a desired control strategy, such as maintaining a pressure or flow. Details of the control strategy are described below in relation to FIGS. 2-8.

Figure 2:
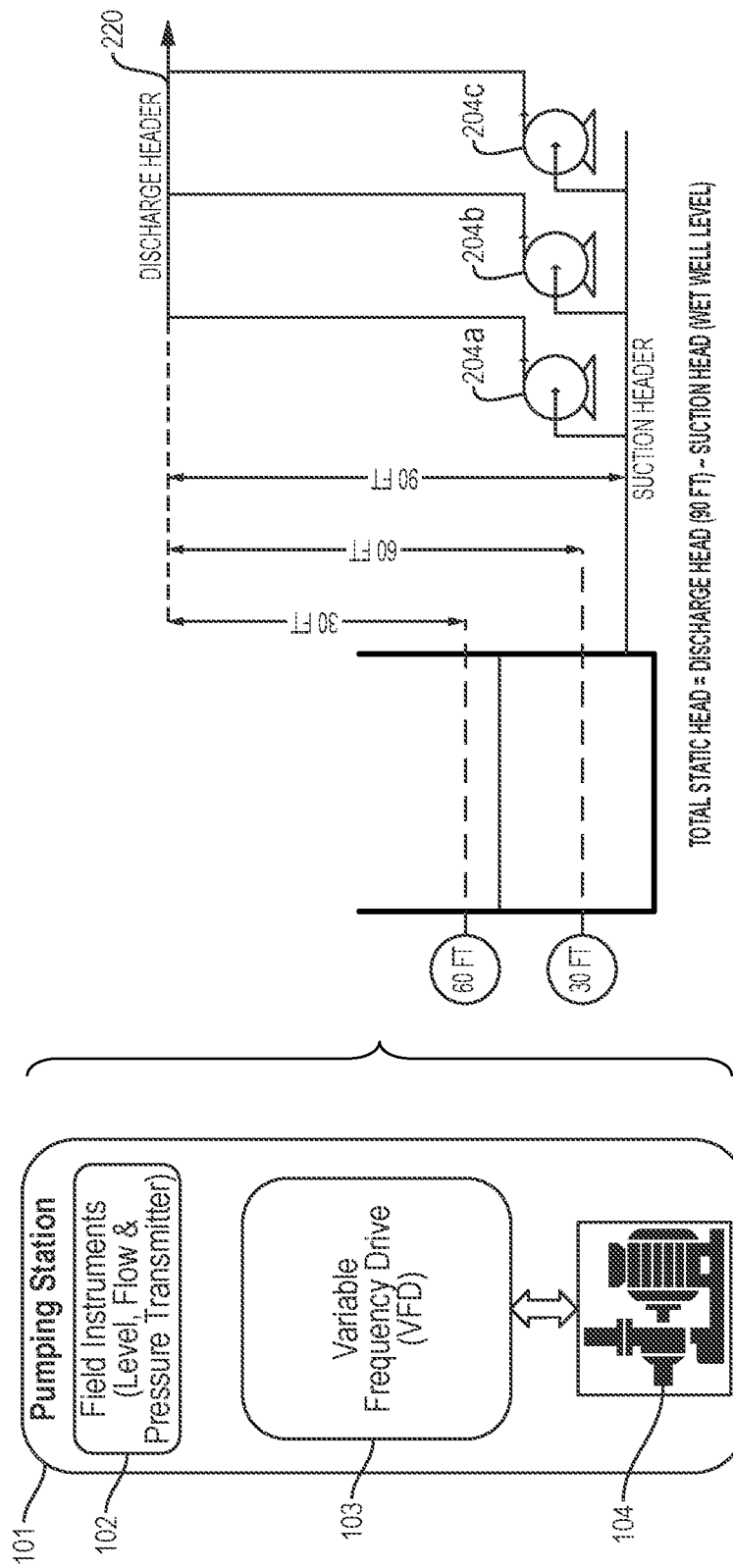
FIG. 2 is a schematic diagram showing conventional pumping system instrumentation.

FIG. 2 shows typical instrumentation installed at a wastewater pump station 101. The pump station 101 depicted in FIG. 2 includes field instruments 102, a VFD 103, and single pump 104. While the single pump 104 is shown in the pump station 101, the pump station 101 may include any number of pumps. If so modified, the pump station includes a VFD 103 and field instruments 102 for each pump 104.

FIG. 2 illustrates such a real-world use case. In particular, FIG. 2 illustrates three identically sized pumps 204a-c operating in parallel and discharging to a common header 220 that ties into a treatment plant. As noted above, each pump 204a-c can be incorporated into the pump station 101 along with respective field instruments 102 and VFDs 103.

Figure 3:
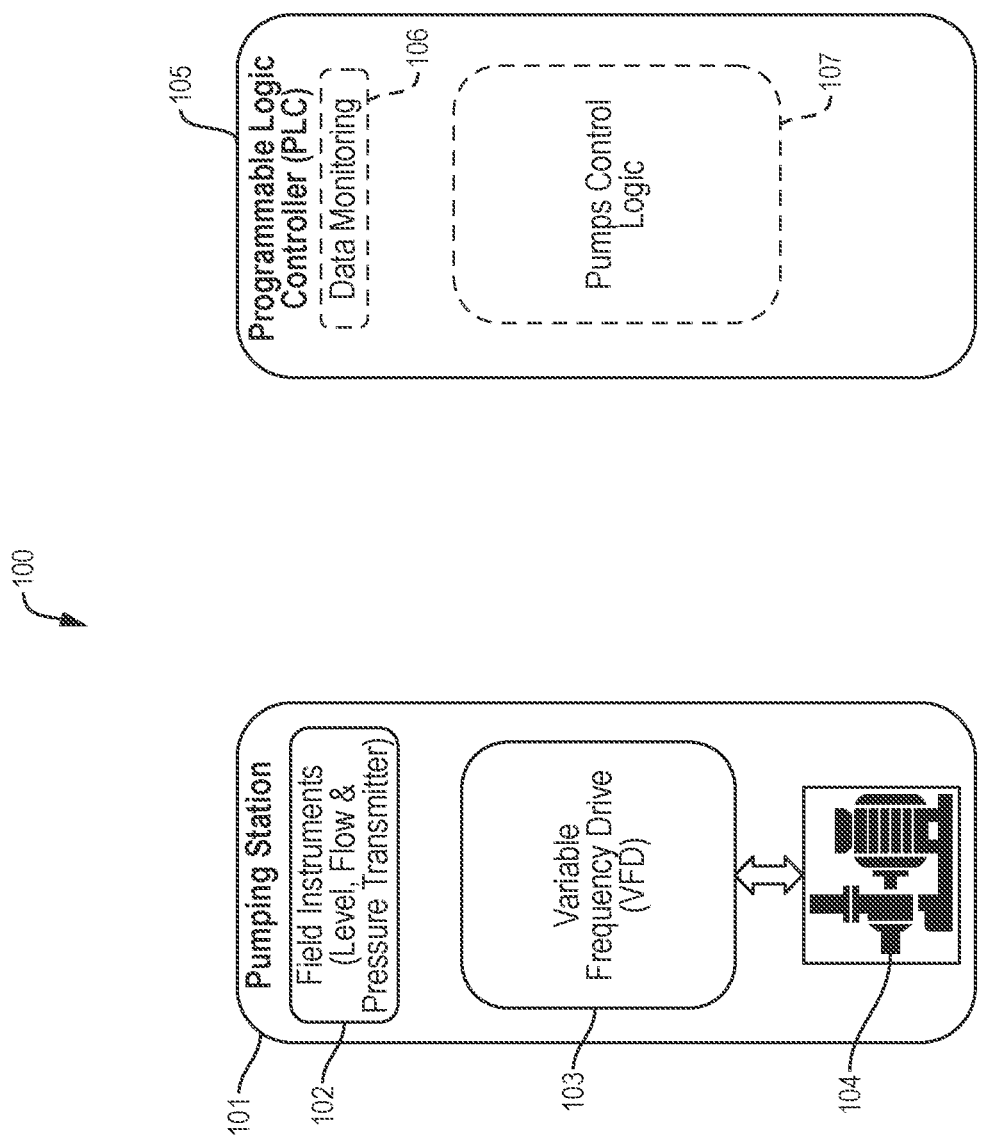
FIG. 3 illustrates control system hardware that may be implemented in a pumping system.

FIG. 3 expands on FIG. 2 and introduces the PLC hardware 105 to the system 100. The PLC 105 is a ruggedized computer designed for use in control systems. The PLC 105 implements data monitoring 106 by receiving data through its inputs and includes control logic 107 to control field devices and/or send operating instructions through its outputs. The PLC 105 contains computer programming in memory to implement the mathematical techniques and system theory of the conventional method of programming and control (Pumps Control Logic 107). These two pieces (mathematical techniques and system theory) combine to form the logic 107 that is responsible for achieving the desired result, e.g., level setpoint 110.

Figure 4:
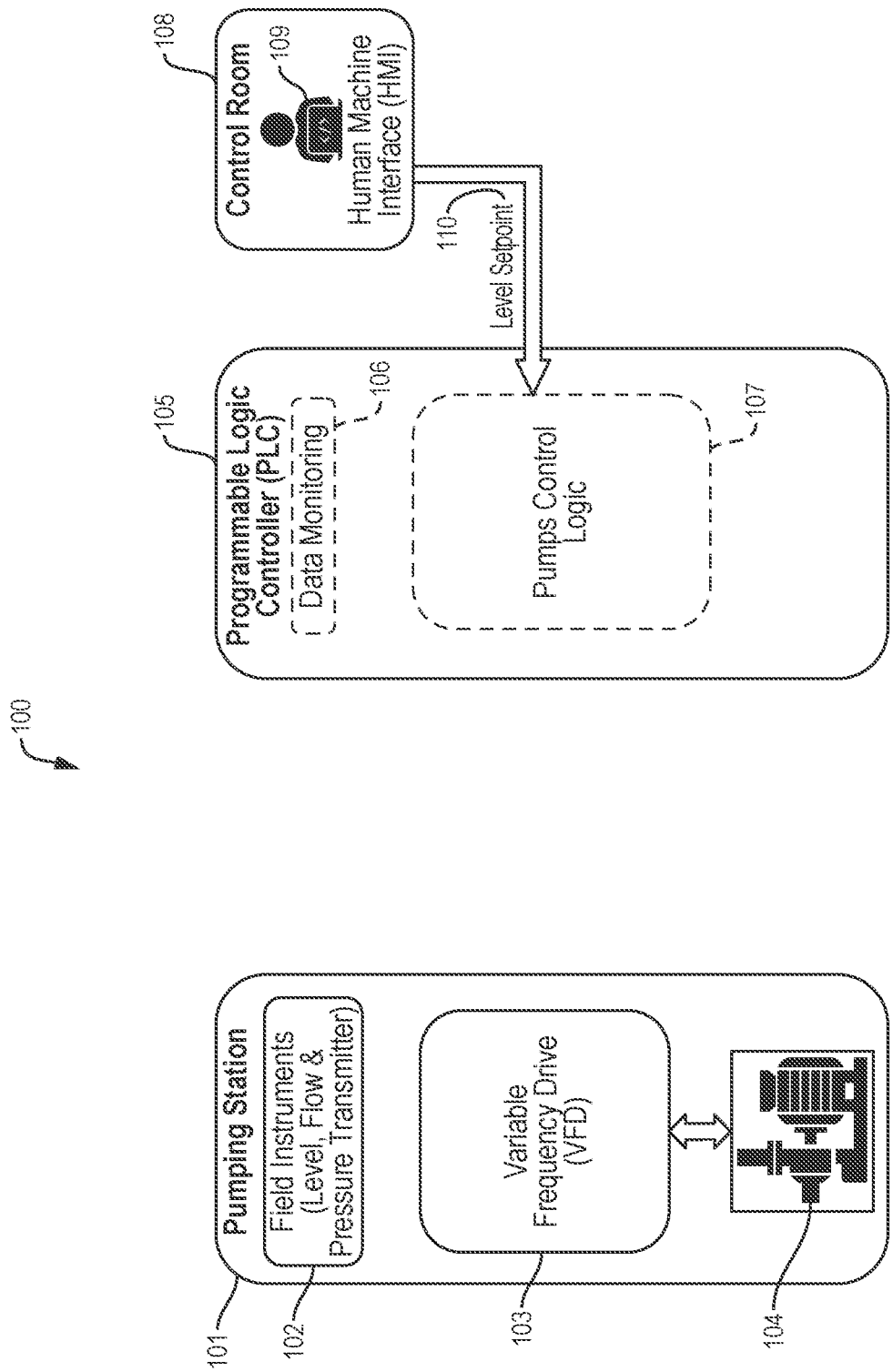
FIG. 4 is a schematic diagram showing level setpoint control in a conventional pumping system.

FIG. 4 expands on FIG. 3 and introduces the control room 108 with HMI 109 and level setpoint 110 to the control system 100. The control room 108 is where an operator enters a level setpoint 110 for a wet well (not shown), via the HMI 109. The level setpoint 110 is received by the PLC 105 and used in the pump control logic 107. Use of the level setpoint 110 is described in subsequent figures and the accompanying description.

Figure 5:
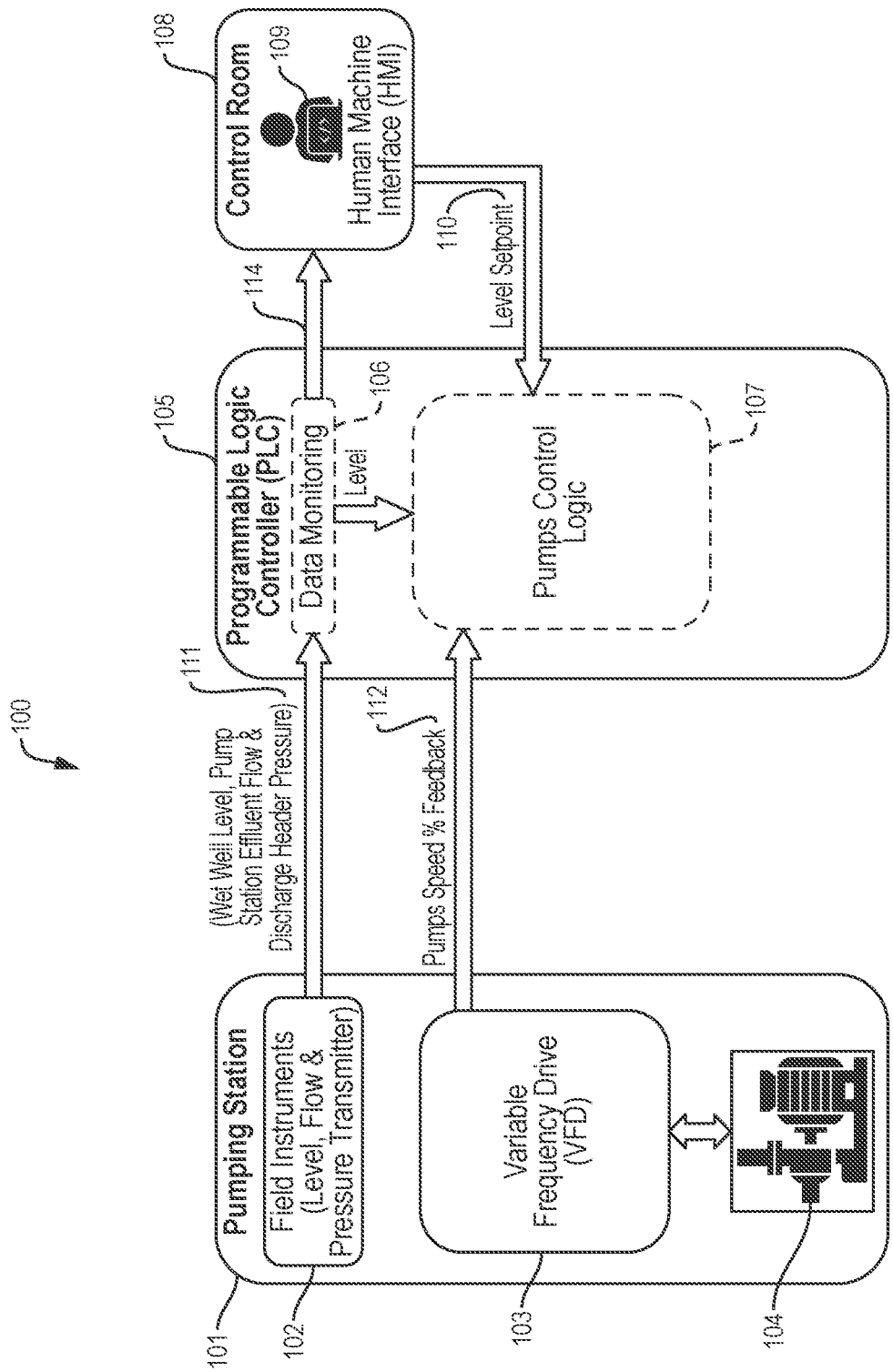
FIG. 5 depicts utilizing field instrument, i.e., sensor, signals in a pumping system.

FIG. 5 expands on FIG. 4 and introduces the field instrument signals 111 and 112 to the control system 100. In this particular use case, a level transmitter (one of the field instruments 102) provides data 111, including real-time wet-well level, to the PLC's 105 data monitoring 106. Moreover, the VFD 103 provides real-time pump speed 112 to the PLC's 105 pump control logic 107. The field instruments 102 also include a magnetic flow meter and pressure indicating transmitter (installed on the common discharge header 220) to provide real-time pump station effluent flow and discharge header pressure as part of the data 111 to the PLC 105 for data monitoring 106.

In operation, some signals 111 are used for monitoring 106 and some are used by the pumps' control logic 107. In the example of FIG. 5, the level 113 is provided to the pump control logic 107, while the real-time pump station effluent flow and discharge header are received at the PLC's 105 data monitoring 106 and passed 114 to the control room 108. In such an implementation, the real-time pump station effluent flow and discharge header are not used by the pumps' control logic 107.

Figure 6:
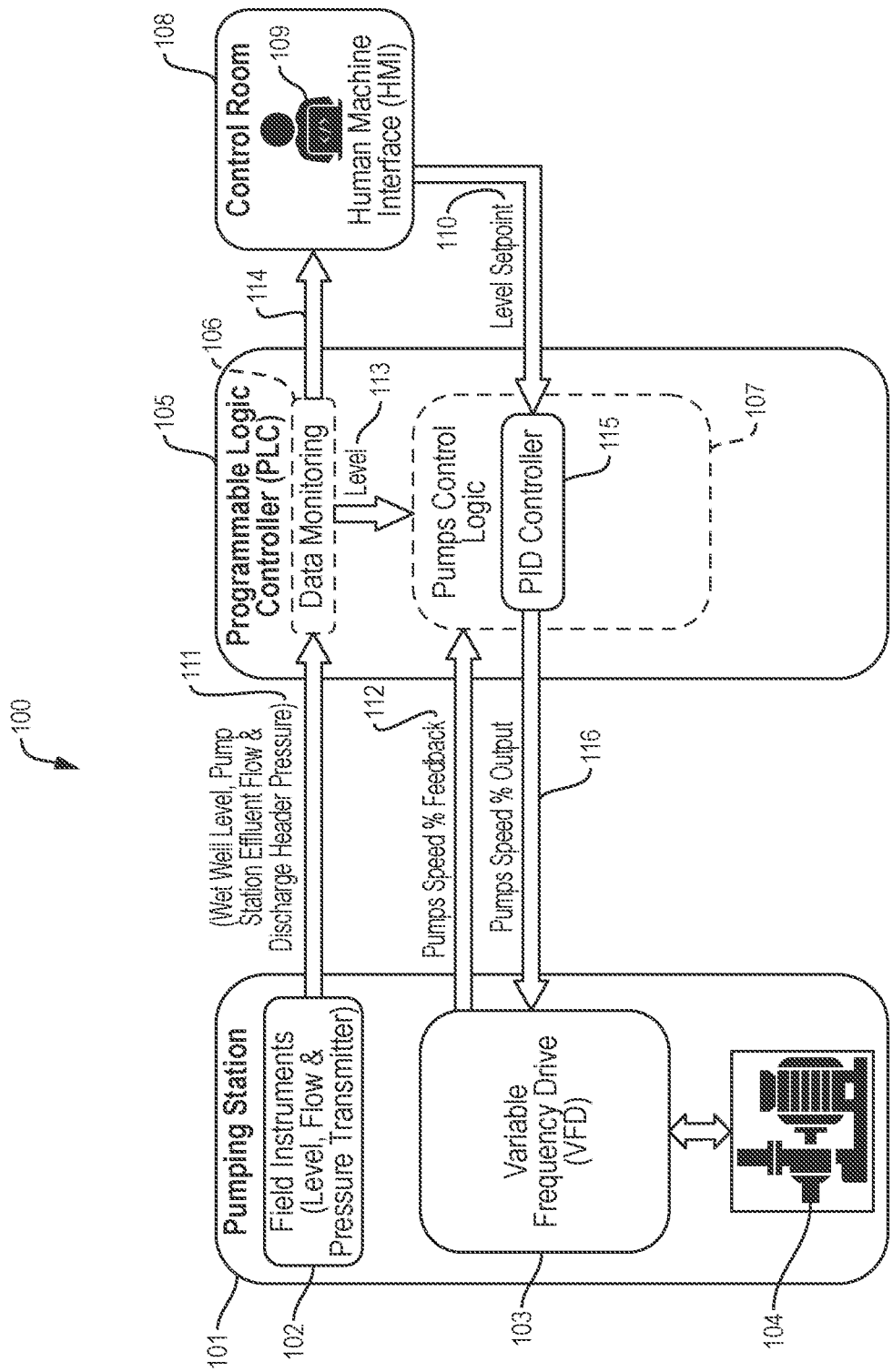
FIG. 6 illustrates a conventional method of speed programming and control in a pumping system.

FIG. 6 expands on FIG. 5 to show how the conventional method of programming and control, which has not been improved on in many years, is used to achieve the desired result in the system 100. As stated previously, the desired result is to maintain the operator-entered level setpoint 110 precisely and with minimal deviation (error). To maintain the desired level setpoint 110 the pumps' control logic 107 in the PLC 105 includes mathematical techniques and control theory in the form of a PID level controller 115. The PID level controller 115 implements conventional methods of programming and control that are used in conjunction with each other to achieve the desired result 110. The PID level controller 115 is explained in more detail below in relation to FIG. 7. As an introduction, the PID level controller 115 provides a speed output 116 that varies in relation to changing process variables, e.g., data 111 including level 113, and pump speed percentage 112, to maintain the level setpoint 110. The conventional method of programming and control implemented in the system 100 passes the speed output 116 determined by the PID level controller 115 to each pump's 104 VFD 103. This causes the VFD 103 to control the pump 104 in accordance with the speed output 116. Moreover, the PID level controller 115 determines when to turn additional pumps on or off in accordance with the control strategy (e.g., certain level triggers when additional pump(s) turn on/off).

Figure 7:
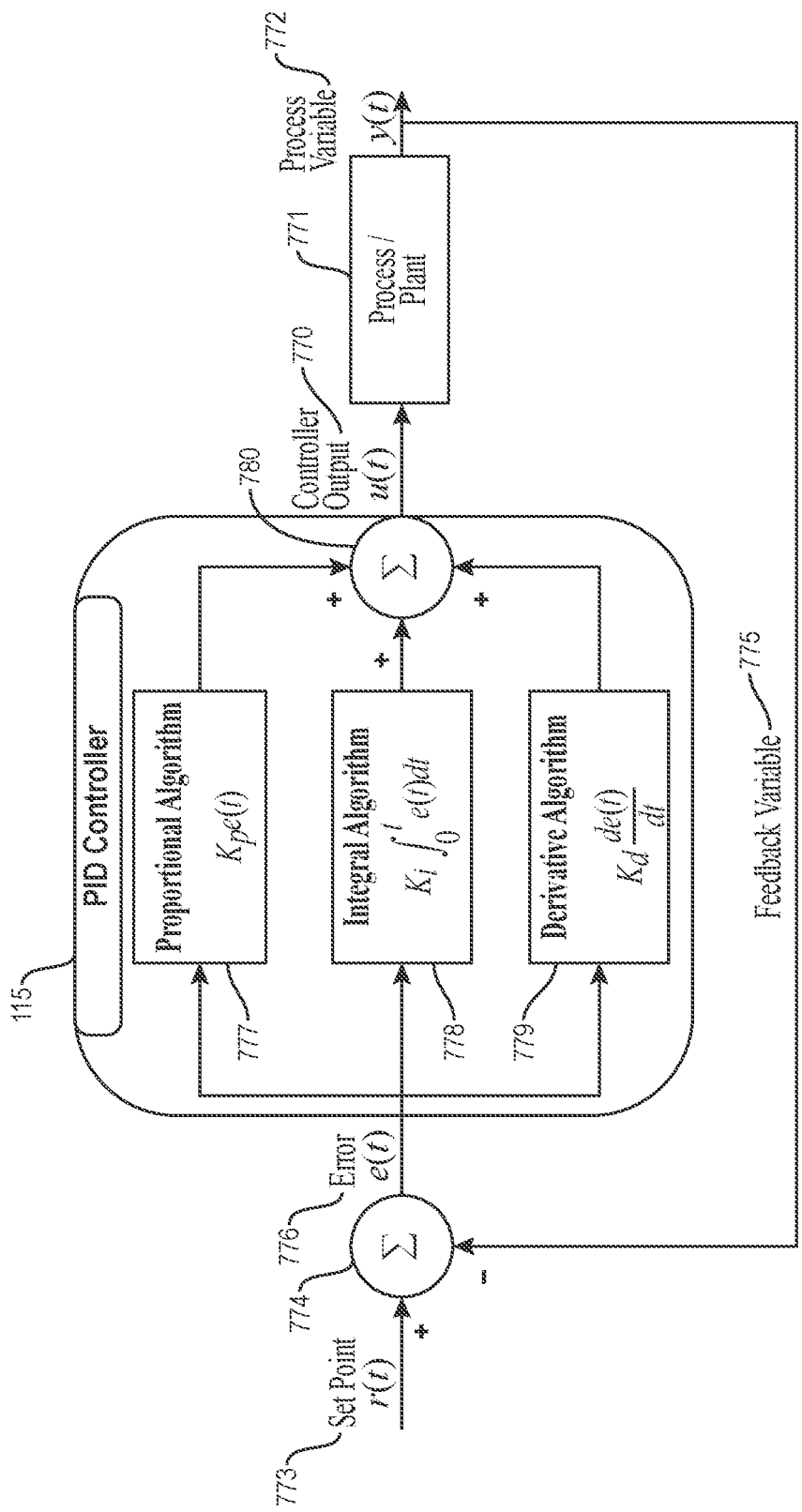
FIG. 7 is a diagram showing operation of a Proportional Integral Derivative (PID) level controller.

FIG. 7 illustrates the operation of the PID controller 115 and shows the mathematical techniques used to calculate the controller output (CV) 770, e.g., pump speed percentage 116 of FIG. 6, using existing methods. The controller 115 output 770 is the operational command sent via PLC output to the field device in the process/plant 771 responsible for maintaining the process variable (PV) 772 at the desired setpoint (SP) (e.g. level, pressure, flow, etc.) 773. The most basic explanation of how the PID controller 115 works is, it compares 774 a SP 773 to the PV 772 feedback signal 775 and calculates an error 776. In turn, the proportional algorithm 777, integral algorithm 778, and derivative algorithm 779 combine to form one algorithm that calculates 780 a value 770 used by the PID controller 115 as output. Analyzing the mathematical formulas yields a greater understanding of how each component (P 777, I 778, and D 779) contributes to the controller 115 output 770 as a function of the calculated error over time, based on the error at that moment. In embodiments, the PID controller 115 functionality and proportional algorithm 777, integral algorithm 778, and derivative algorithm 779 are implemented in accordance with principles known to those of skill in the art.

Figure 8:
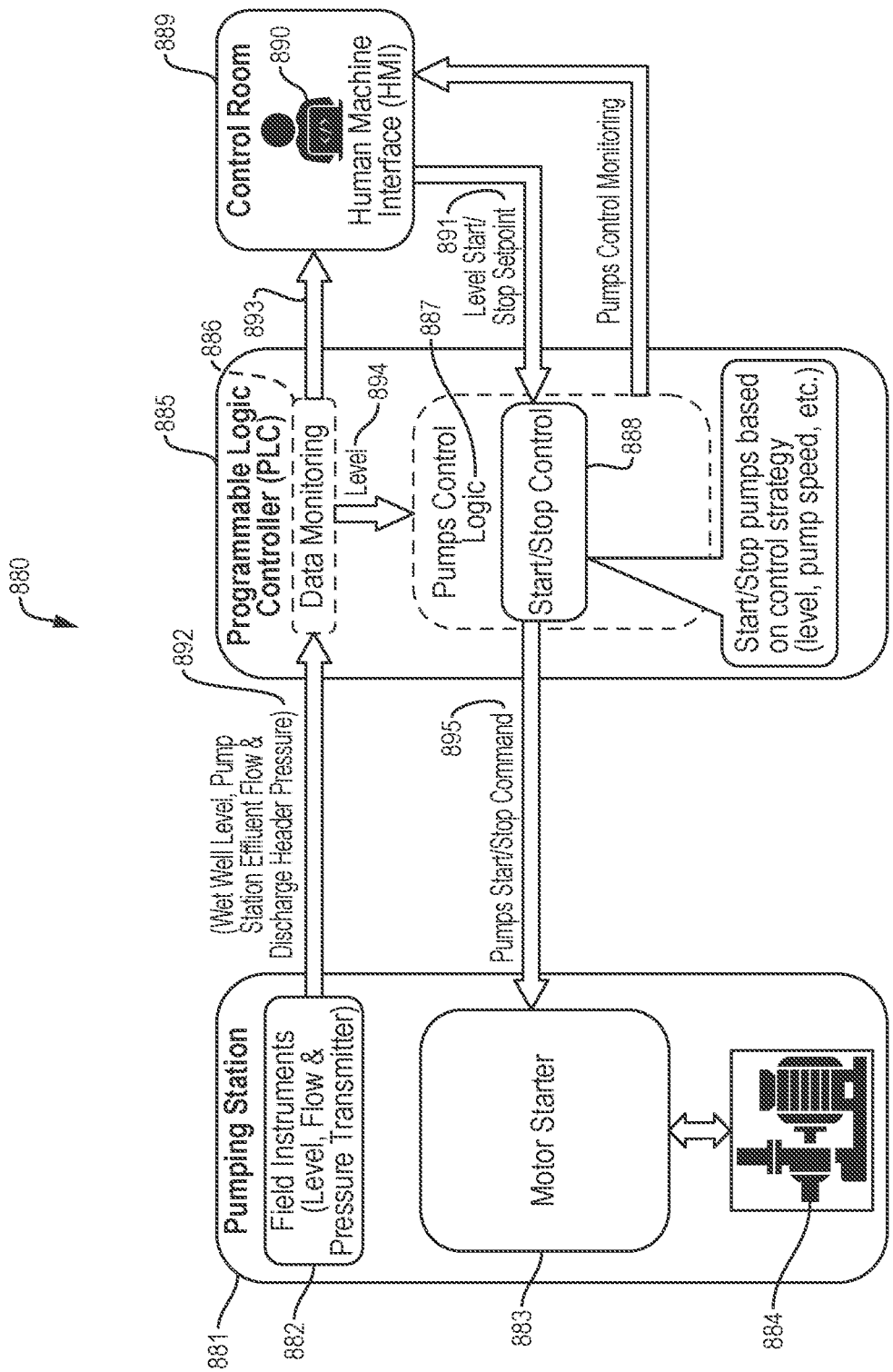
FIG. 8 is a block diagram showing a control system using a conventional method of programming to achieve a desired result using a motor starter.

FIG. 8 shows another control system 880 in which a conventional method of programming is used. The system 880 achieves a desired result via a motor starter 883 that is driving the equipment 884. The desired result is typically a fill up/draw down control strategy.

The system 880 includes the pumping station 881 which includes the field instruments 882, motor starter 883, and pump 884. Moreover, the system 880 includes the PLC 885, with data monitoring 886, pump control logic 887, and start/stop control 888. The PLC 885 is connected to the control room 889 which includes a HMI 890.

In operation, a level setpoint is set 891 via the HMI 890. Moreover, data 892 is collected by the field instruments 882 and sent to the data monitoring module 886 of the PLC 885. From the data monitoring module 886, data for further monitoring 893 is sent to the control room 889 and data 894, e.g., level, is sent to the pump control logic 887. The pump control logic 887 determines when to start/stop the pump 884, and sends the determined start/stop commands 895, via the start/stop control 888 to the motor start 883. The motor starter 883 then starts/stops the pump 884 in conjunction with the command 895.

Figure 9:
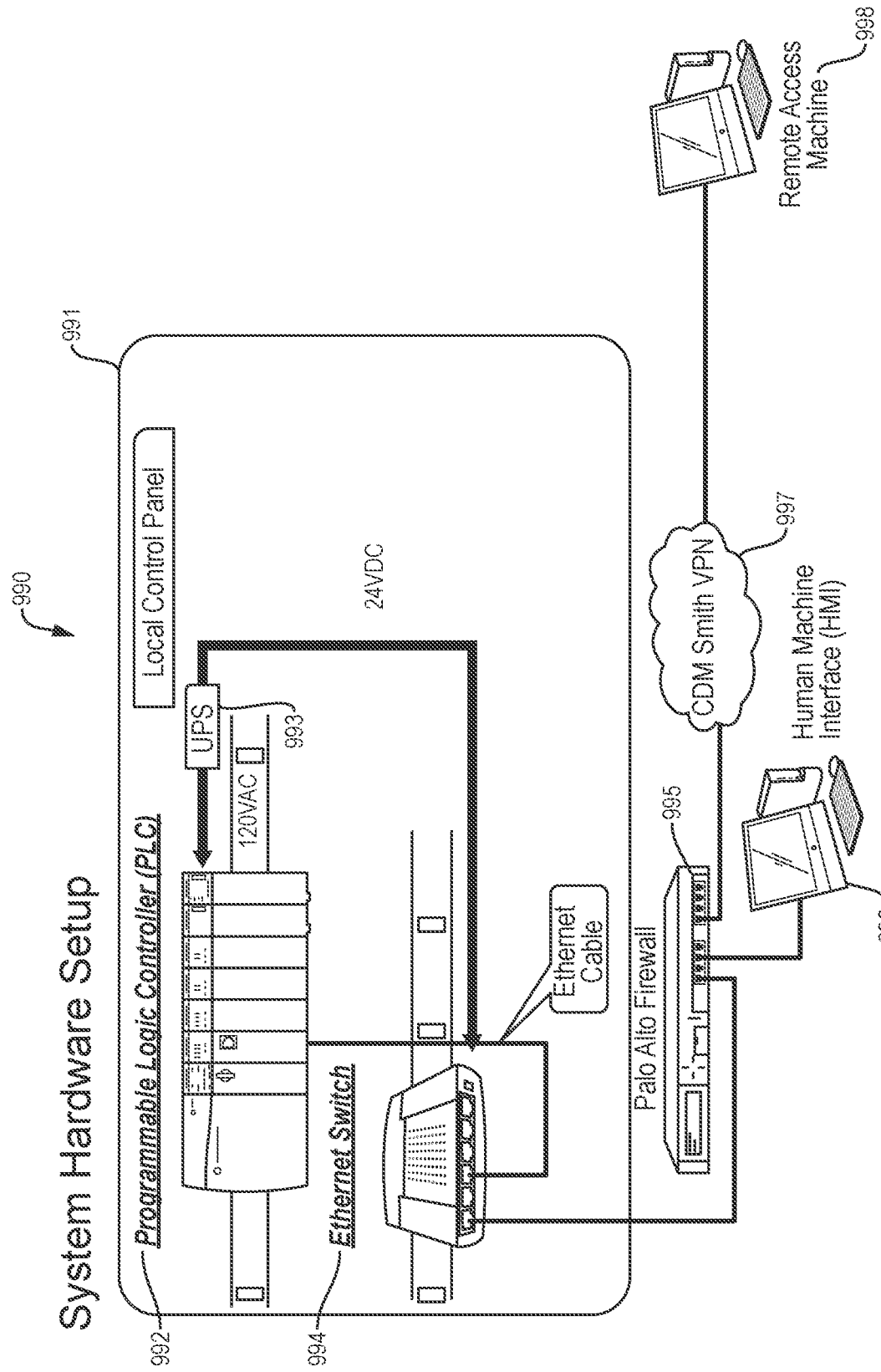
FIG. 9 depicts a conventional control system hardware set-up.

FIG. 9 shows a typical hardware and system architecture 990 found in most control systems. The hardware architecture 990 may be used in the conventional method of programming and control described hereinabove.

The architecture 990 includes a local control panel 991 which includes the PLC 992, uninterruptible power supply (UPS) 993, and ethernet switch 994. The UPS 993 provides power to both the PLC 992 and ethernet switch 994. The ethernet switch 994 is communicatively coupled to the PLC 992 and firewall 995. The firewall 995 is also coupled to the HMI 996 and, via the network 997, remote access machine 998. In operation, data is received from the PLC 992 at the HMI 996 and/or remote access machine 998 and controls can be sent from the HMI 996 and remote access machine 998 to the PLC 992 in the control panel 991. While not illustrated, the PLC 992 can be coupled to pumping station, e.g., 101, and implement controls as described hereinabove in relation to the PLC 105 of the system 100.

Machine Learning Model Based Mechanical System Control

Having outlined a conventional method of control, the description continues below where the following sections break down the individual components of embodiments of the present disclosure, and explain how the components combine in a unique way to provide a new method of programming and control for motor driven equipment and systems.

A detailed explanation of the advanced mathematical techniques and methodologies used to achieve a specific function within a component of embodiments is provided. Explanations of how each component combines to form this new functionality that is capable of changing the way control systems influence control of motor driven equipment and systems are provided.

Figure 10:
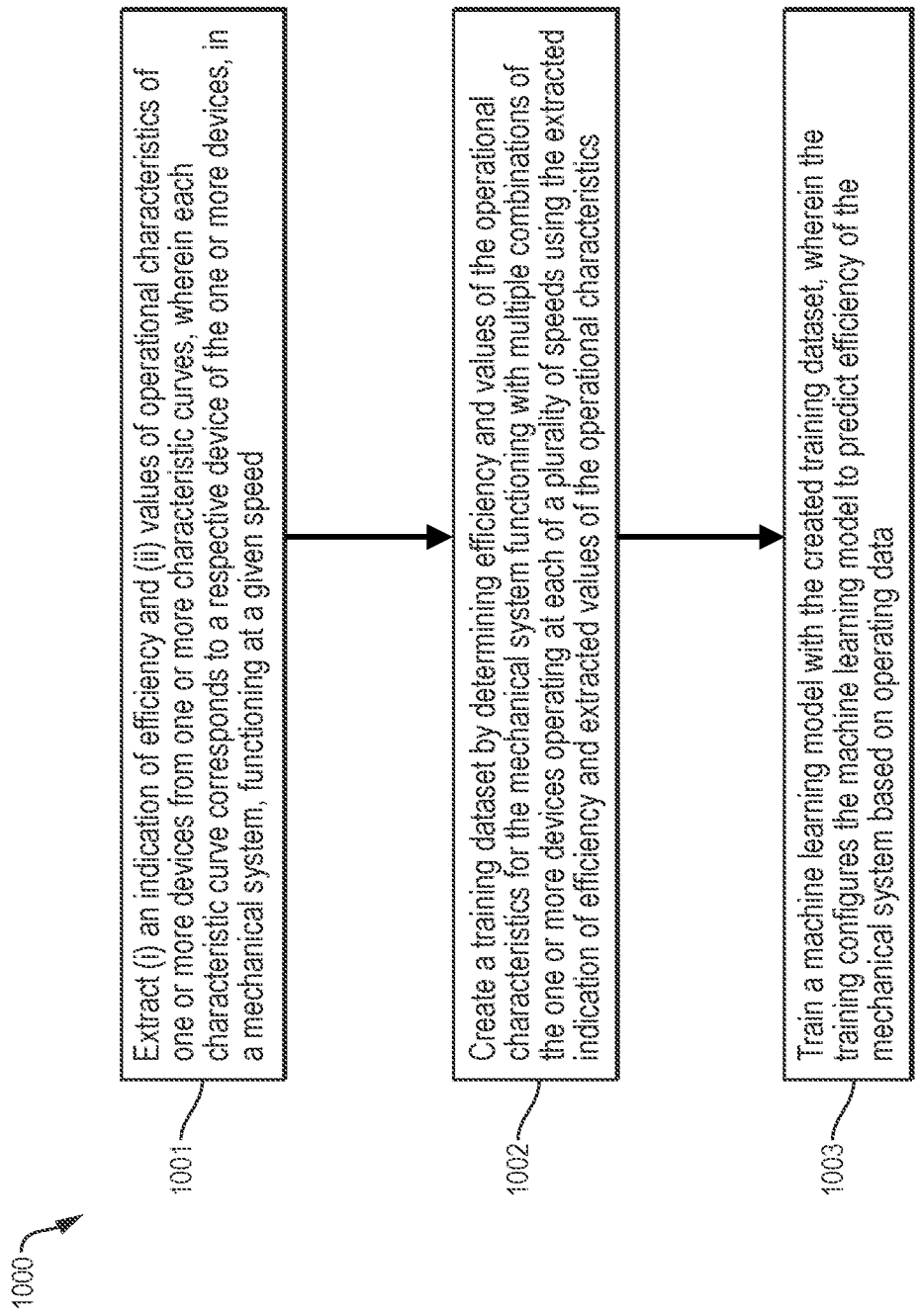
FIG. 10 is a flow diagram of a method of creating a machine learning model for real-world mechanical system control according to an embodiment.

FIG. 10 is a flow diagram of a method 1000 that creates a machine learning model for real-world mechanical system control.

Figure 13:
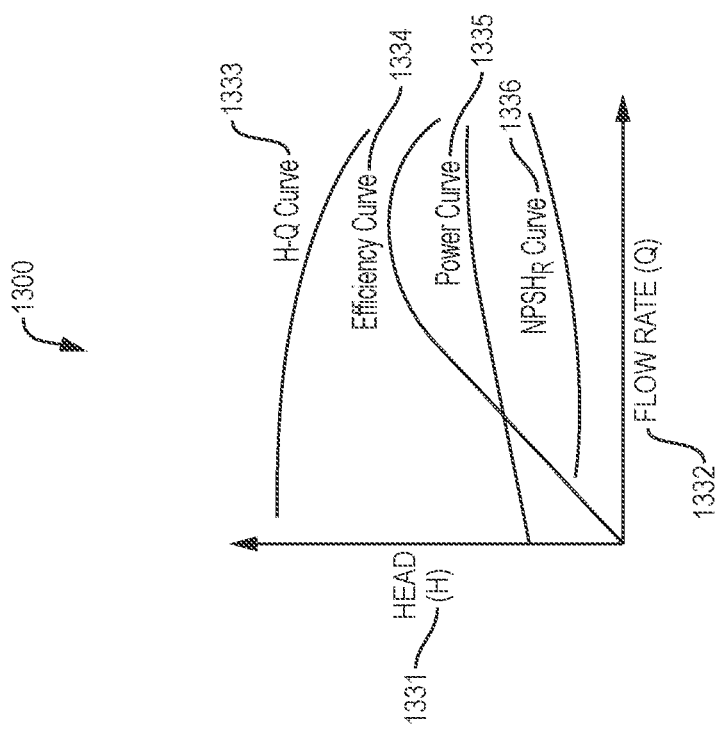
FIG. 13 is a plot with pump characteristic curves that may be leveraged by embodiments.

The method 1000 begins at step 1001 and extracts (i) an indication of efficiency and (ii) values of operational characteristics of one or more devices from one or more characteristic curves. According to an embodiment, the extraction is done at step 1001 using a plot digitizer tool as described hereinbelow in relation to FIG. 15. Each characteristic curve, of the one or more characteristic curves, corresponds to a respective device of the one or more devices, in a mechanical system, functioning at a given speed, e.g. 100% speed. In embodiments, the operational characteristics include at least one of: head-flow (H-Q) data, best efficiency point (BEP), system flow at BEP, and rated rotations per minute (RPM). An example curve 1300 is shown in FIG. 13 and described in detail hereinbelow.

To illustrate step 1001, consider a mechanical system that includes two pumps, pump-A and pump-B. At step 1001, the method 1000 uses two curves, a curve for pump-A and a curve for pump-B, that indicate efficiency and operational characteristics of pump-A and pump-B when each pump is operating at 100% speed. From these curves, the method 1000, at step 1001, determines efficiency data, e.g., BEP, and operational characteristic data, e.g., H-Q data, RPM, etc., for each pump when operating at 100% speed.

Returning to FIG. 10, at step 1002, the method 1000 creates a training dataset by determining efficiency and values of the operational characteristics for the mechanical system functioning with multiple combinations of the one or more devices operating at each of a plurality of speeds. In an implementation, the efficiency and values are determined using the data extracted at step 1001, i.e., the extracted indication of efficiency and extracted values of the operational characteristics.

To illustrate step 1002, consider the aforementioned example where the mechanical system includes pump-A and pump-B. At step 1001, the method 1000 determines efficiency and operational characteristics of pump-A and pump-B when pump-A and pump-B are each operating at 100% speed. This data is then used at step 1002 to create the training dataset of the whole mechanical system. First the efficiency and operational characteristics of each pump, alone, across the entire speed range (0-100%) is determined, i.e., calculated. Then, the efficiency and operational characteristics for pump-A and pump-B operating at different speeds as a complete mechanical system, i.e., together, is determined. For example, step 1002 may determine efficiency and operational characteristics when just pump-A is running at 75% speed, 50% speed, and 25% speed. Likewise, step 1002 may determine efficiency and operational characteristics when just pump-B is running at 75% speed, 50% speed, and 25% speed. Further, the method 1000 may determine efficiency and operational characteristics when both pump-A and pump-B are running at 75% speed, 50% speed, and 25% speed.

In an embodiment of the method 1000, the values of the operational characteristics for the mechanical system functioning with multiple combinations of the one or more devices operating at each of a plurality of speeds are further determined at step 1002 using at least one of: regression analysis and one or more physics-based laws that indicate changes to the operational characteristics as a function of speed of the one or more devices. In an implementation, the one or more physics-based laws include affinity law equations. According to an embodiment, the values of the operational characteristics for the mechanical system functioning with multiple combinations of the one or more devices operating at each of a plurality of speeds are determined using the one or more physics-based laws by calculating coefficients for a plurality of polynomial equations. Said coefficients are determined by fitting the extracted values of the operational characteristics to the plurality of polynomial equations. According to such an implementation, the polynomial equations are indicated by the one or more physics based laws and each of the plurality of polynomial equations indicates values of the operational characteristics for the mechanical system as a function of speed of the one or more devices. Moreover, in such an implementation the calculated coefficients are used in at least of subset of the plurality of polynomial equations to determine the values of the operational characteristics of the mechanical system functioning with multiple combinations of the one or more devices operating at each of the plurality of speeds.

Returning to FIG. 10, the method 1000 continues at step 1003 by training the machine learning model with the created training dataset. The training 1003 configures the machine learning model to predict efficiency of the mechanical system based on operating data. Implementations of the method 1000 may use any machine learning models known in the art. For instance, according to an example implementation, the machine learning model trained at step 1003 is one of: a polynomial regression model, random forest regression model, Xgboost model, and an Artificial Neural Network (ANN) model.

Embodiments of the method 1000 may be configured to train a machine learning model to control any desired mechanical system. For example, the mechanical system may be a pump or blower system driven by a variable frequency drive device.

In an implementation of the method 1000, the trained machine learning model is configured to predict efficiency of the mechanical system during operation performed using a subset of the one or more devices in the mechanical system. Such an implementation may implement such functionality by training a plurality of machine learning models at step 1003 with the training dataset. In such an implementation, each machine learning model of the plurality predicts efficiency of the mechanical system based on operating data corresponding to the mechanical system operating using a respective unique subset of the one or more devices in the mechanical system. To illustrate, once again consider the example of a system comprising pump-A and pump-B. Such an embodiment may train machine learning models that predict efficiency for scenarios of using pump-A alone, pump-B alone, and pump-A together with pump-B.

After the training 1003, the method 1000 may embed the trained machine learning model into an edge device. Such an edge device may be communicatively coupled to the mechanical system to facilitate control of the mechanical system. In another embodiment, the method 1000 stores the trained machine learning model in memory that can be accessed by the mechanical system, e.g., via one or more networks. In such an implementation, the mechanical system is communicatively coupled to the trained machine learning model so as to determine an operating scenario with optimized efficiency and operate in accordance with this scenario.

Another implementation of the method 1000 deploys the trained machine learning model to control operation of the mechanical system. According to one such example implementation, deploying the trained machine learning model includes (i) obtaining real-time operating data for the mechanical system, (ii) processing the obtained real-time operating data with the trained machine learning model to predict efficiency of the mechanical system operating in accordance with each of a plurality of operating scenarios, (iii) based on the predicted efficiency of each of the plurality of operating scenarios, selecting a given operating scenario of the plurality, and (iv) controlling the mechanical system in accordance with the selected operating scenario. In an implementation, prior to processing the obtained real-time operating data, format of the obtained real-time operating data is converted to a format compatible with the trained machine learning model. According to another aspect, the selected operating scenario includes at least one of a number of devices and an indication of which devices to operate.

To illustrate deploying the trained machine learning model(s) consider the aforementioned example where three machine learning models are trained, pump-A alone, pump-B alone, and using pump-A together with pump-B. In such an illustrative embodiment, operating data, e.g., data on Flow and Head is received indicating that pump-A is running at a high speed and pump-B is running at a relatively lower speed. In such an illustrative embodiment, the data is processed by the machine learning model regarding pump-A alone to predict the system operating at 50% efficiency. Likewise, the data is processed by the machine learning model regarding pump-B alone to predict the system operating at 60% efficiency and the data is processed by the machine learning model regarding pump-A and pump-B together to predict the system operating at 70% efficiency. As such, the scenario of pump-A and pump-B together is selected. In such a situation, the model trained for pump-A and pump-B together, will bring the speed of pump-A down and increase the speed of pump-B so the combined system operates at a common speed at the most efficient point.

Embodiments of the method 1000 may employ the techniques described hereinbelow in relation to the "Training Phase" at steps 1001, 1002, and 1003. Moreover, embodiments of the method 1000 may employ and implements techniques described hereinbelow in relation to the "Operational Phase."

Figure 11:
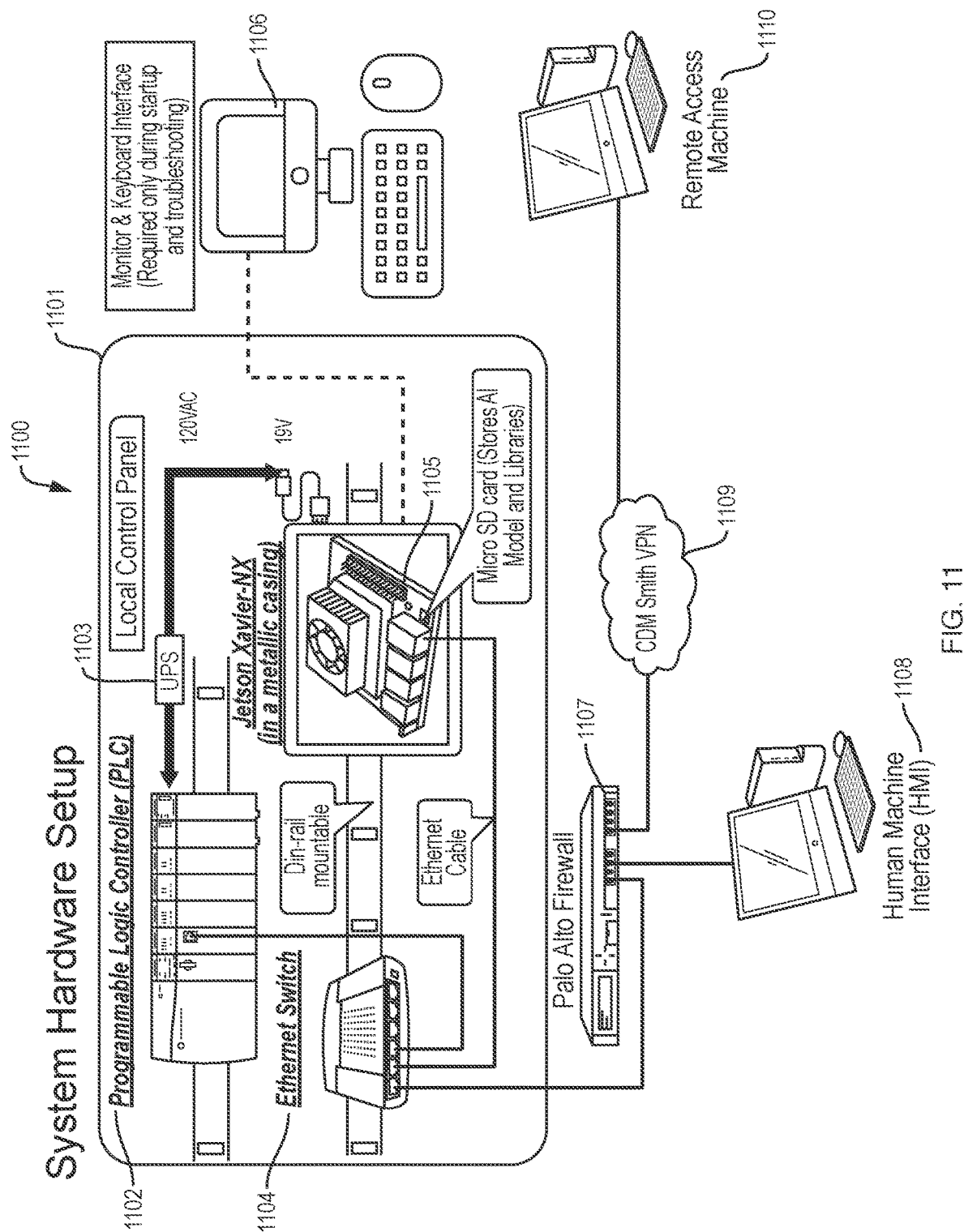
FIG. 11 depicts a control system hardware set-up in which embodiments may be implemented.

FIG. 11 shows a hardware system 1100 in which embodiments, e.g., method 1000, described herein may be implemented. The system 1100 includes a local control panel 1101 which includes the PLC 1102, UPS 1103, ethernet switch 1104, and AI device 1105. The AI device 1105 stores an AI model and associated libraries used to implement the embodiments described herein. In the control panel 1101, the UPS 1103 provides power to the PLC 1102, ethernet switch 1104, and AI device 1105. The ethernet switch 1104 communicatively couples the PLC 1102 and AI device 1105. Further, the AI device 1105 can be communicatively coupled to the monitor and keyboard 1106 for system start-up and trouble shooting.

The control panel 1101 is connected to the firewall 1107 via the ethernet switch 1104. The firewall 1107 is also coupled to the HMI 1108 and, via the network 1109, remote access machine 1110. In operation, data is received from the PLC 1102 at the HMI 1108 and/or remote access machine 1110 and controls can be sent from the HMI 1108 and remote access machine 1110 to the PLC 1102 in the control panel 1101. Further, as will be described in further detail below, the PLC 1102 can utilize the AI device 1105 to control motor drive systems.

The system 1100 is a new hardware setup and network architecture for control systems in the sense that an AI device 1105 is connected to a PLC 1102 over Ethernet and is a component of the control system 1100 as a whole. Data exchanged between the AI device 1105 and PLC 1102 is described hereinbelow. The integration of AI 1105 into control systems to change the way motor driven equipment and motor driven systems are controlled is new. It should be noted that a control system network, its hardware, and associated field/network connections can vary greatly from system to system depending on various factors, such as owner implemented security policies and, as such, embodiments are not limited to the hardware configurations described and illustrated herein, e.g., the system 1100 of FIG. 11.

While not illustrated, the PLC 1102 can be coupled to devices, e.g., pumping station, 1201. Through such connections and use of the AI device 1105, the PLC 1102 can implement controls as described herein to control operation of the devices.

Figure 12:
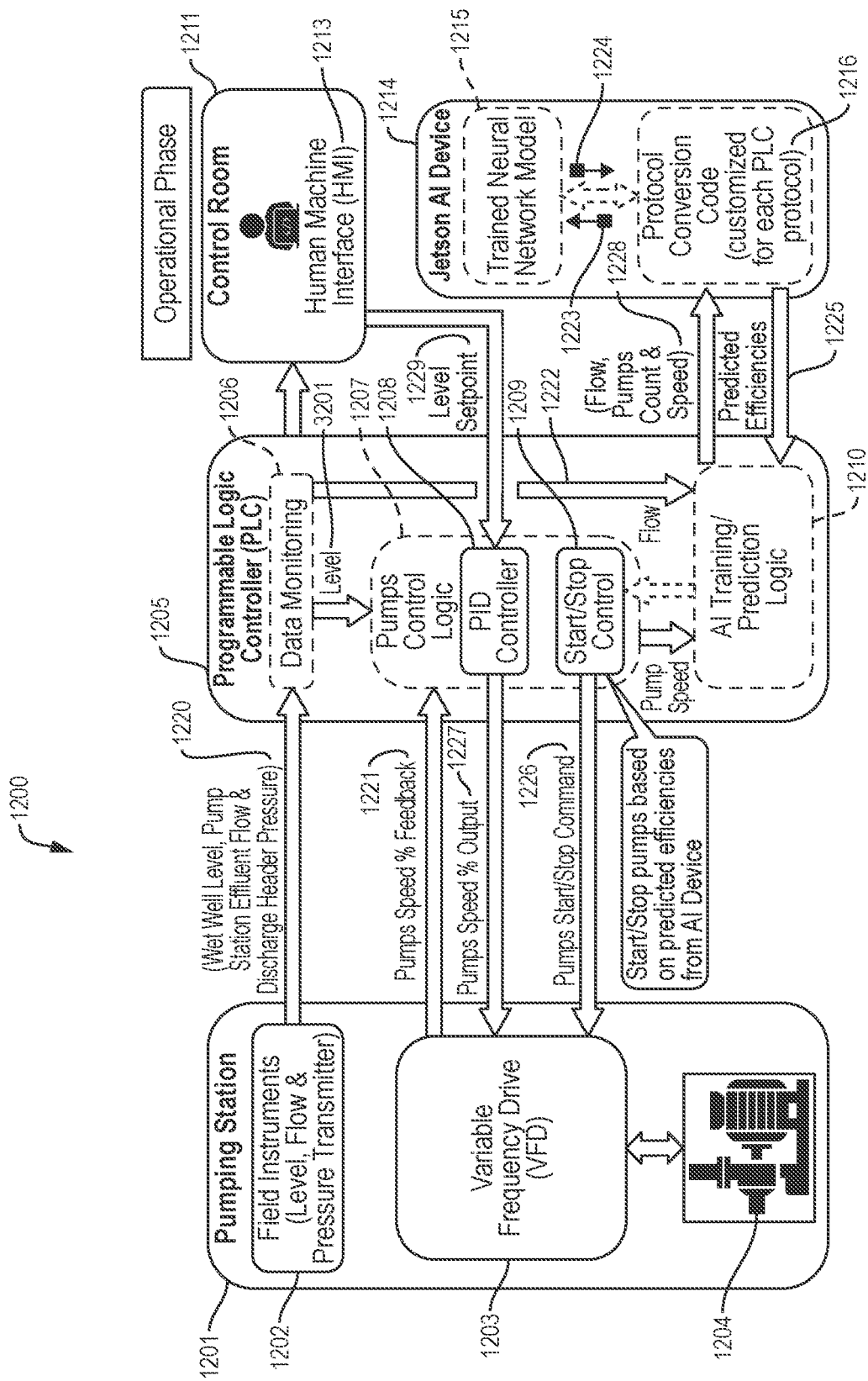
FIG. 12 is a block diagram illustrating an embodiment of artificial intelligence based mechanical system control according to an embodiment.

FIG. 12 is a high level depiction of a control system 1200 in which embodiments can be implemented. The system 1200 includes a pumping station 1201, programmable logic controller (PLC) 1205, control room 1211, and AI device 1214. The pumping station 1201 includes one or more field instruments, i.e., sensors, 1202, e.g., level, flow and pressure transmitter, a VFD 1203, and a pump 1204. The PLC 105 includes a data monitoring module 1206, pump control logic module 1207, and AI prediction module 1210. The pump control logic module 1207 includes a PID controller 1208 and start/stop controller 1209. The AI prediction module 1210 is coupled to the AI device 1214 which includes the trained neural network model 1215 and protocol conversion code 1216. Further, the control room 1211 includes a HMI 1213.

FIG. 12 also shows a flow of data for a method of programming and control, according to an embodiment, and how this embodiment is interfaced to the pumping system in the illustrated real-world use case example. It is important to understand that this flow of data is applicable to all motor-driven equipment and motor-driven systems regardless of the desired result. For example, and sticking with the wastewater industry, a pumping system could be replaced with a blower system with a desired result of maintaining a Dissolved Oxygen (DO) setpoint in an aeration basin. Regardless of the industry or equipment/system to be controlled, embodiments are applicable to all motor-driven equipment and/or systems.

The flow of data in the system 1200 can be broken down into the following stages:

Step 1: The VFD 1203 and field instruments measure 1202 and pass real-time process values 1220 and 1221 to the PLC 1205. In particular, the field instrument 1202 collected data 1220 is passed to the data monitoring module 1206 of the PLC 1205. The pump speed data 1221 is passed to the pump control logic 1221.

Step 2: In the PLC 1205 the data 1220 and 1221 is sent from the data monitoring module and pump control logic 1207, respectively, to the AI logic module 1210. From the AI logic module 1210, the data 1228 is sent to the AI device 1214, which may be a Jetson Xavier device or any other AI device, using the EtherNet/IP protocol. In operation, embodiments can employ any PLC protocol, such as Modbus TCP/IP, but in the use case described herein, the PLC 1205 utilizes EtherNet/IP.

Step 3: The data 1228 is converted from EtherNet/IP to Ethernet inside the Jetson Xavier AI 1204 device using new custom Python code and open source Python code/libraries implemented by the code module 1216.

Step 4: The data is packaged in an EtherNet data packet 1223 and sent from the protocol conversion code module 1216 to the neural network 1215 for processing.

Step 5: The neural network 1215 predicts the efficiency of the pumping system when one pump, two pumps, or three pumps are running and communicates those predictions 1224 to the conversion module 1216, which converts the data 1224 and communicates the predicted efficiencies 1225 to the PLC 1205 through the new protocol conversion module 1216.

Step 6: The predictions 1225 are used in the new method of programming and control 1210 to send start/stop commands 1226, via the start/stop controller 1209, to cause the VFD 1203 to turn pump 1204 on and off in order to operate the pumping system as efficiently as possible. Pump speed control 1227 is managed by the PID level controller 1208 in accordance with a desired setpoint 1229.

Steps 1-6 above illustrate one such example implementation and, in operation, the system 1200 can implement any embodiments of programming and control described herein to achieve a desired result. A significant number of mathematical techniques and formulas are utilized by embodiments to execute the modified control strategy depicted in FIG. 12, all of which are explained in detail in subsequent paragraphs. Comparing the system 1200 of FIG. 12 to the system 100 of FIG. 1 clearly illustrates the changes to the control strategy and how embodiments interface with the control system to make it possible. Details of the control strategy are described below in relation to FIGS. 13-38.

Before the system 1200 can operate, the system 1200 is programmed and configured, as explained in the next paragraphs. There are two phases involved with the new functionality of programming and control described herein: (1) a training phase and (2) an operational phase.

The equations, e.g., affinity law equations, presented below are for the real-world use case described herein, controlling centrifugal pumps. The affinity law equations in particular are specific to centrifugal pumps and, therefore, the particular extrapolation of pump curve data described below is specific to centrifugal pumps. However, it is noted that embodiments are not limited to controlling centrifugal pumps and, instead, embodiments can be used to control any motor-driven system. In such implementations, known operating equations for these systems are used to determine efficiency data of the systems under different operating conditions. This efficiency data is used to create a training data set, e.g., via extrapolation, that is used, as described herein. For example, the training data set can be used to implement AI functionality to create a model capable of predicting efficiency as described herein.

Training Phase

Before the operational phase and control strategy depicted in FIG. 12 can be implemented, the neural network goes through a training phase so that a model, e.g., 1215, of the pumping system can be created. The training phase includes two general steps: (1) create a training data set and (2) create model(s) of the motor driven machine, e.g., pumping system, using neural network(s).

Creating a Training Dataset

An explanation is provided below illustrating creating training data for a pump using the pump's associated pump curve. Ultimately, the training dataset is used in the neural network to develop a model of the pumping system. A pump is a mechanical piece of equipment and, as such, efficiency is measured as follows:

Efficiency=Hydraulic power $(P_h)$/Pump Shaft Power where, $P_h$=(Flow through the pump×Total Head)−(Suction Head×Density×Acceleration due to gravity)

The pressure (head) that a pump develops is proportional to the impeller diameter, size of the impeller eye, and the shaft speed. The relationship between pump flow and total head of the pump is inversely proportional. When this relationship is plotted on a graph it results in a curve that is commonly referred to as the pump head curve, or H-Q curve.

The relationship between flow and efficiency, flow and power, and flow and NPSHR (Net Pressure Suction Head Required) is plotted on a graph and is called the pump characteristic curve. A typical pump characteristic curve plot 1330 is shown in FIG. 13. FIG. 13 is a plot 1330 of head 1331 versus flow rate 1332. The plot 1330 includes the H-Q curve 1333, efficiency curve 1334, power curve 1335, and NPSHR curve 1336.

Typically, pump characteristic curves, e.g., the plot 1330, are developed by pump manufacturers, and are unique to each pump. The information provided in the pump characteristic curve is for the pump operating at 100% speed. To create a training data set, an embodiment extrapolates various pieces of information from the pump characteristic curves for the pump operating at 100% speed. Ultimately, the AI portion of embodiments uses the training data set created to generate a model of the pumping system that is capable of predicting efficiency within the operating parameters of the pumping system.

Parameters of the Pump Characteristic Curves

Figure 14:
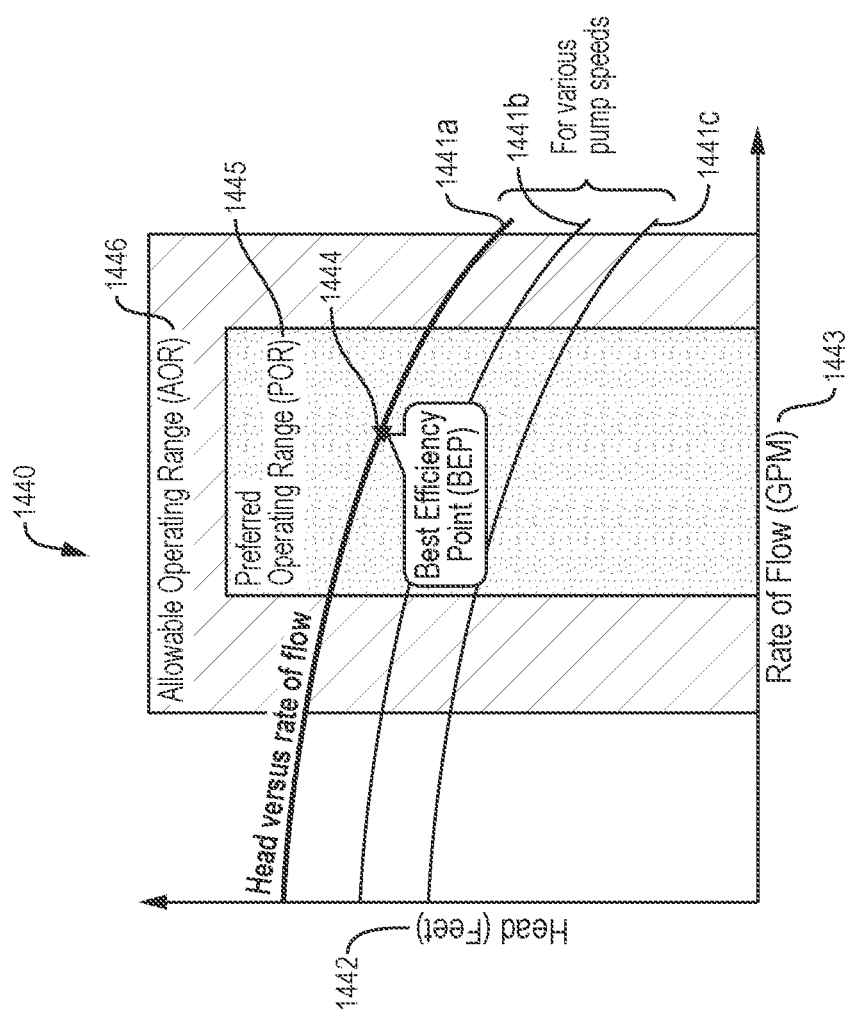
FIG. 14 is a plot of pump characteristic curves with defined regions that may be employed by embodiments.

Operational parameters and operational boundaries of the pump are shown in the plot 1440 of FIG. 14. Typically, such parameters are established by the Performance Standard Hydraulic Institute (HI) 9.6.3. The plot 1440 includes curves 1441a-c of head 1442 versus rate of flow 1443 for a pump operating at various speeds. In the plot 1440, Best Efficiency Point (BEP) 1444 is the most efficient operating point of the pump for all possible process conditions seen by the pumping system. BEP 1444 is also the highest point of the efficiency curve 1334 shown in FIG. 13.

The Preferred Operating Region (POR) 1445 is a region defined by the Hydraulic Institute (HI) in the HI Standard 9.6.3 (HI Standard 9.6.3—2012 Rotodynamic (Centrifugal and Vertical) Pumps—Guideline for Preferred and Allowable Operating Region) and is typically between 70 and 120 percent of the flow at BEP 1444. When a pump is operating in this region 1444 it requires a smaller NPSH margin and will have the lowest vibration readings.

The Allowable Operating Region 1446 is a region that is also defined by the same Hydraulic Institute (HI) standard as POR 1445. The vibration level in the AOR 1446 is much higher at 30% more than the lowest vibration level in the POR region 1445.

Extracting Information from Pump Curves

Figure 15:
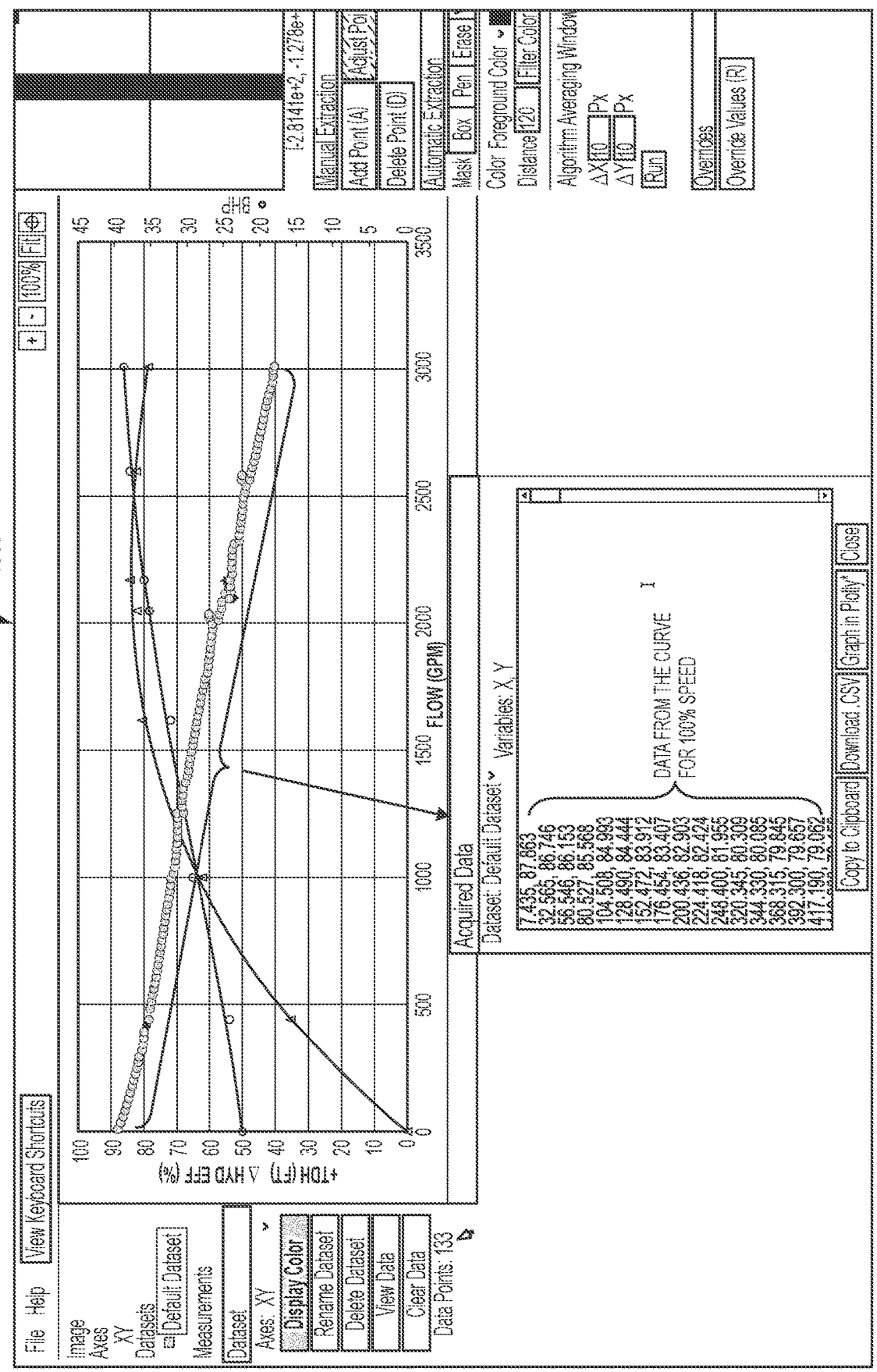
FIG. 15 is a screenshot showing a data extraction process used in an embodiment.

An embodiment extracts H-Q curve and efficiency curve data points from curve plots provided by a manufacturer. One such embodiment utilizes a plot digitizer tool, e.g., such as the web-based tool available at https://automeris.io/WebPlotDigitizer/, to extract H-Q curve and efficiency curve data points from the pump characteristic curves. FIG. 15 is a screenshot 1550 depicting the plot digitizer tool executing the extraction process. In an embodiment, the data extracted is used for developing the complete training data set that is used to train the AI and develop a model capable of making efficiency predictions for use by the control system.

While FIG. 15 illustrates an example extraction process, embodiments are not limited to using the methodology illustrated in FIG. 15 and any data extraction process and tool may be employed. Importantly, embodiments start with known pump curves, e.g., the plot 1330 of FIG. 13, and from the known pump curves, extract the H-Q curve and efficiency curve data points. Further, in an embodiment, additional information about the pump, such as its rated revolutions per minute (RPM) at 100% speed, its BEP, and the system flow at BEP, are also obtained from the manufacturer's pump curve.

Figure 16:
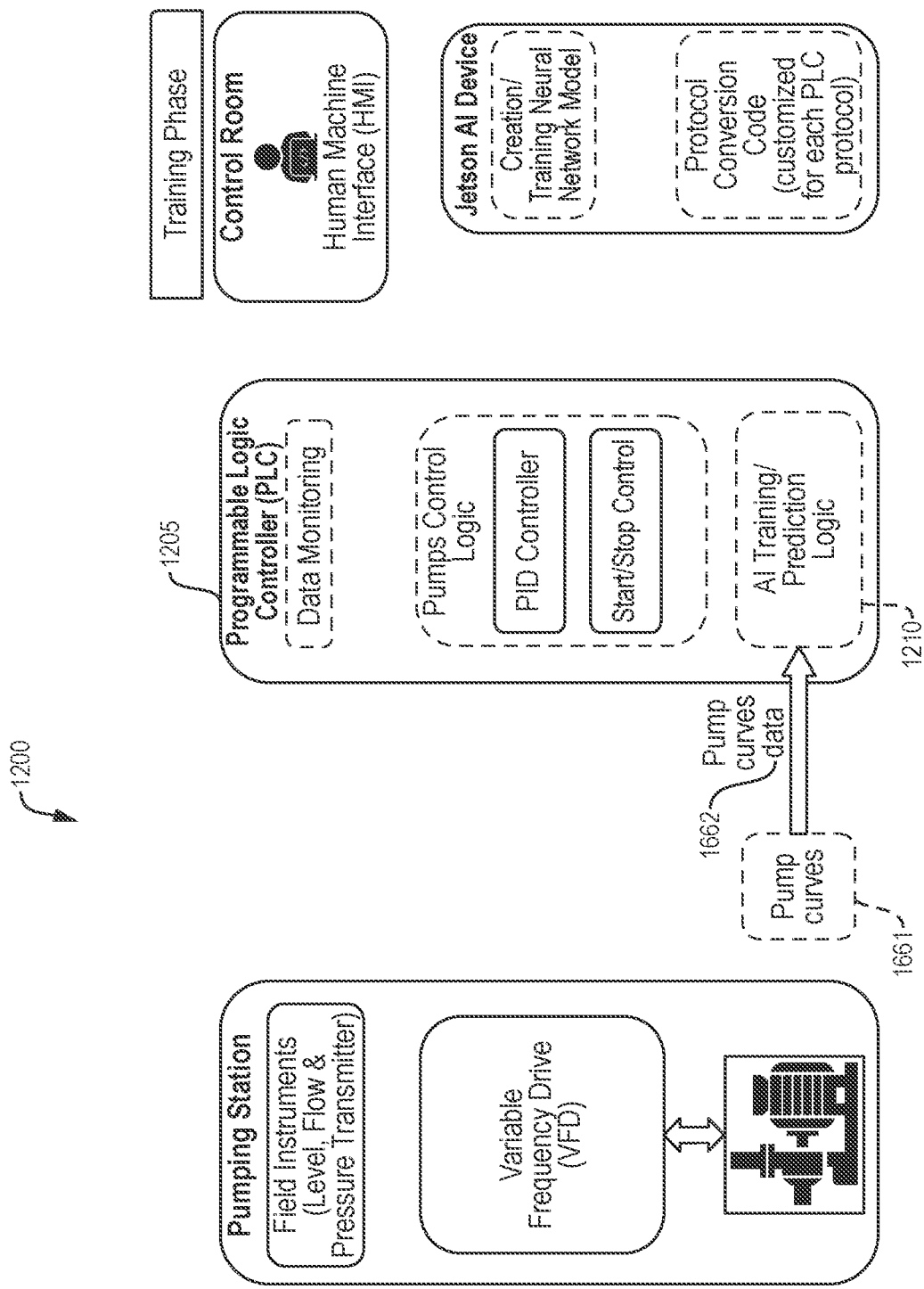
FIG. 16 is diagram illustrating a training phase of an embodiment.

FIG. 16 shows the first step of the training phase described above being implemented in the system 1200. Specifically, during this first step, data 1662 is extracted from the pump characteristic curves 1661 and transferred to the AI training and prediction module 1210 of the PLC.

Generating Pump Curve Coefficients and Variable Speed Pump Curve Data

At this point, the data points used to develop a training data set have been extracted from the pump curve. In an embodiment, such data includes H-Q curve data points, efficiency curve data points, BEP, system flow at BEP, rated RPM. However, this extracted data only corresponds to the pump running at 100% speed. Moreover, it is noted that if the system includes multiple pumps, this data is extracted for each pump.

An embodiment extrapolates the data points for different possible pump speeds, e.g., 0-100%. In other words, such an embodiment determines H-Q curve data points, efficiency curve data points, BEP, system flow at BEP, and rated RPM when the pump is running at speeds other than 100%. Embodiments utilize multiple mathematical techniques and algorithms to manipulate the extracted pump curve information at 100% speed to generate pump curve coefficients. These pump curve coefficients are then used to generate HQ curve information for the pump operating at multiple speeds. In turn, the HQ curves operating at the different speeds are plotted and the BEP along each HQ curve at each of the different pump speeds is identified. The following is a description and explanation of the techniques and methodologies used according to an embodiment.

Pump Affinity Laws for Single Pump System

Figure 19:
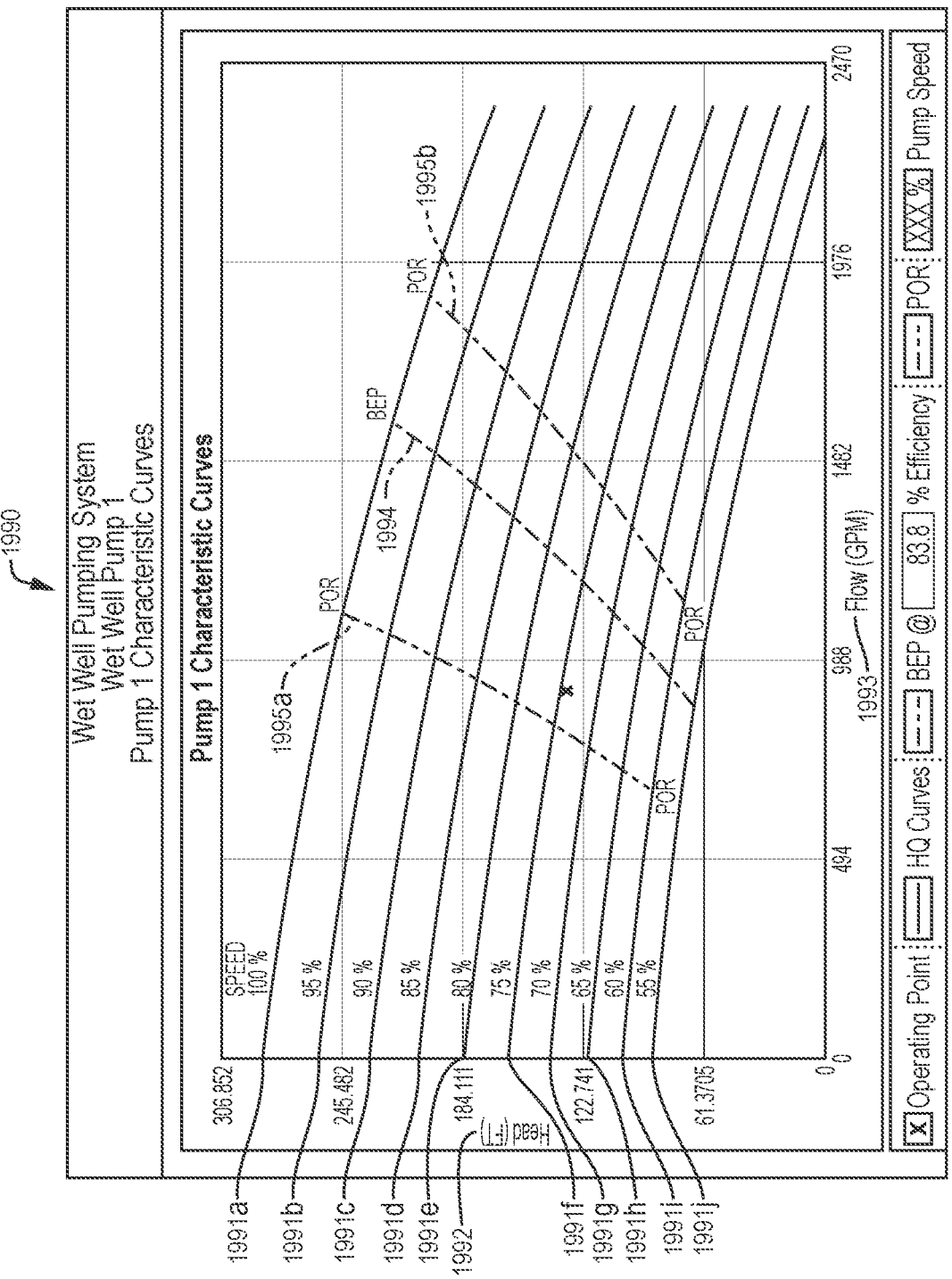
FIG. 19 is a plot showing pump speed characteristic curves determined by an embodiment.

The affinity laws are applicable to centrifugal pumps, and describe the mathematical relationship between several pump performance variables. These variables include flow, head, absorbed power, and speed. The affinity laws are used by embodiments to predict the effect speed changes have on a pumping system. More specifically, how the parameters of the pumping system shown in FIG. 13 will change as the speed of the pump is varied. A H-Q curve for different pump speeds is illustrated in FIG. 19 described below.

The following methodologies show how the affinity laws are used by embodiments to generate pump curve information for multiple pump speeds.

Pump Affinity Law Equations

The following equations describe the mathematical relationship between flow, head, and absorbed power to speed, and are known as the affinity laws:

$$Q \alpha N$$

$$H \alpha N^2$$

$$P \alpha N^3 \quad (1)$$

Where: Q=Flow rate, H=Head, P=Power absorbed, N=Rotating speed

Moreover, as shown by the equations (2) below, flow is proportional to the speed, head is proportional to the square of the speed, and power is proportional to the cube of speed:

$$Q_1/Q_2 = N_1/N_2$$

$$H_1/H_2 = (N_1^2)/(N_2^2)$$

$$P_1/P_2 = (N_1^3)/(N_2^3) \quad (2)$$

The affinity laws define a linear, quadratic, and cubic speed dependence of flow, head, and power respectively. A reduction of pump speed will relate to a second-order reduction in the head. As described in "Optimisation and Modelling Techniques in Dynamic Control of Water Distribution Systems" by Bryan Couldbeck available at https://etheses.whiterose.ac.uk/14668/1/583353.pdf, the following variable Power Law Head-Flow model provides a mathematical model of the Head (H)—Flow (Q) curve. According to this model, the relation between H and Q can be expressed as:

$$H = a - bQ^c$$

Where H=Pump head increase, Q=Pump flow, and a, b, c=Coefficients derived from the manufacturer's pump characteristics curve or from on-site measurement for highest accuracy.

However, because the characteristic curve is no longer valid when pump speed is varied, embodiments use the first two affinity law equations described above to express the relationship between N, H, and Q for various Head-Flow models. The equations associated with each Head-Flow model are described below.

For pumps that fall under the Quadratic Polynomial Head-Flow Model the following equations are used:

$$H = aQ^2 + bQ + c \text{ Pump at nominal speed}$$

$$H = a'Q^2 + b'Q + c' \text{ Pump at reduced speed} \quad (3)$$

The ratio of reduced speed to nominal speed is expressed as $N_2/N_1$. Instead of calculating the $N_2/N_1$ using the speed in revolutions per minute (RPM), it can be represented as a percent of nominal speed n. Now the relationship between the Quadratic Polynomial Head-Flow Coefficients for nominal speed and reduced speed is expressed as follows:

$$a' = a$$

$$b' = b*n$$

$$c' = c*n^2 \quad (4)$$

For pumps that fall under the Cubic Polynomial Head-Flow Model the following equations are used:

$$H = aQ^3 + bQ^2 + cQ + d \text{ Pump at nominal speed}$$

$$H = a'Q^3 + b'Q^2 + c'Q + d' \text{ Pump at reduced speed} \quad (5)$$

The relationship between Cubic Polynomial Head-Flow Coefficients for nominal speed and reduced speed is expressed as follows:

$$a' = a/n$$

$$b' = b$$

$$c' = c*n$$

$$d' = d*n^2 \quad (6)$$

Individual pump efficiency is a function of the pump flow and the pump speed, which is approximated in embodiments by a fourth-order polynomial as shown below.

$$\text{Eff} = eQ^4 + fQ^3 + gQ^2 + hQ + i \text{ Pump at nominal speed}$$

$$\text{Eff} = e'Q^3 + f'Q^2 + g'Q^2 + h'Q + i' \text{ Pump at reduced speed} \quad (7)$$

The relationship between Efficiency Coefficients for nominal speed and reduced speed is expressed as follows:

$$e' = e/(n^4)$$

$$f' = f/(n^3)$$

$$g' = g/(n^2)$$

$$h' = h/n$$

$$i' = i \quad (8)$$

Estimating the Polynomial Coefficients

Figure 17:
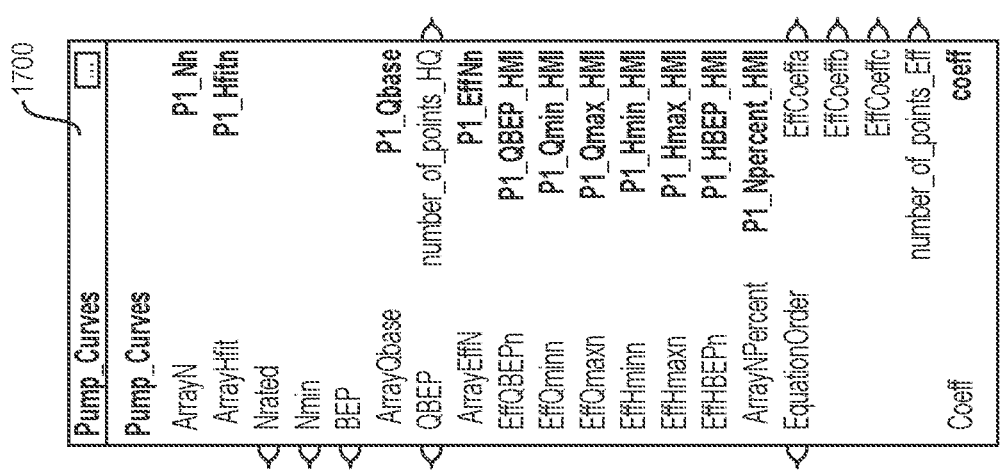
FIG. 17 depicts an add on instruction (AOI) used in a training phase according to an embodiment.
Figure 18:
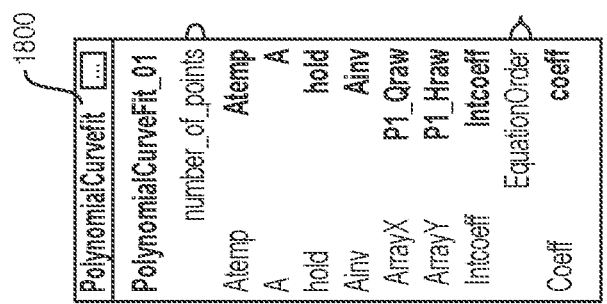
FIG. 18 illustrates an AOI used in a training phase of an embodiment.

The next step is to fit the H-Q curve data points extracted from the pump's characteristic curve to a second order polynomial equation (equations 3 and 4 above) or to a third order polynomial equation (equations 5 and 6 above). A statistical measure namely Adjusted R-Squared analysis is used to determine how close the data are to the fitted polynomial equation. This analysis is performed for both the second order and third order polynomial equations, the higher the value of Adjusted R-Squared, the better the model fits the data. This is used to determine if the H-Q curve fits better to a second order or to a third order polynomial. The efficiency curve data points are fit into a fourth order polynomial (equations 7 and 8 above). By executing this analysis, a characteristic curve for multiple pump speeds can be created. In an example embodiment, custom PLC code is utilized to create an Add On Instruction (AOI) that generates the characteristic curves for various pump speeds. An example AOI 1700 that performs this functionality is shown in FIG. 17.

To achieve the polynomial curve fitting, an embodiment uses the general polynomial regression model and the method of least squares. The method of least squares aims to minimize the variance between the values estimated from the polynomial to be more in line with the expected values from the dataset, i.e., remove extremely large variances in the data that would negatively affect the machine learning model. The coefficients of the polynomial regression model ($a_0, a_1, \ldots, a_k$) are determined by solving the following system of linear equations.

$$\begin{bmatrix} N & \sum_{i=1}^{N} x_i & \cdots & \sum_{i=1}^{N} x_i^k \\ \sum_{i=1}^{N} x_i & \sum_{i=1}^{N} x_i^2 & \cdots & \sum_{i=1}^{N} x_i^{k+1} \\ \vdots & \vdots & \vdots & \vdots \\ \sum_{i=1}^{N} x_i^k & \sum_{i=1}^{N} x_i^{k+1} & \cdots & \sum_{i=1}^{N} x_i^{2k} \end{bmatrix} \begin{bmatrix} a_0 \\ a_1 \\ \vdots \\ a_k \end{bmatrix} = \begin{bmatrix} \sum_{i=1}^{N} y_i \\ \sum_{i=1}^{N} x_i y_i \\ \vdots \\ \sum_{i=1}^{N} x_i^k y_i \end{bmatrix}$$

An embodiment utilizes custom PLC code to create an AOI that executes this polynomial curve fitting. An example of an AOI 1800 that performs the curve fitting is shown FIG. 18.

Using the general polynomial regression model and pump affinity laws described above, H-Q curves can be plotted for different speeds and each point on each curve represents a specific efficiency value. Connecting all identical efficiency points on each H-Q curve for each different pump speed by drawing a line yields the iso-efficiency line. Using the iso-efficiency lines, the POR region can be viewed in a plot of H-Q curves for different speeds as shown in FIG. 19.

In FIG. 19, the plot 1990 includes the curves 1991*a-j* showing head 1992 versus flow 1993 for a pump operating at different speeds, specifically, 100%, 95%, 90%, 85%, 80%, 75%, 70%, 65%, 60%, and 55%, respectively. The plot 1990 shows that the iso-efficiency line 1994 is determined by connecting all identical best efficiency points on each H-Q curve 1991*a-j* for each different pump speed. The POR region between the lines 1995*a* and 1995*b* can be identified based on the iso-efficiency line 1994.

Generating Pump Characteristic Curves for Parallel Pumping System

Figure 20:
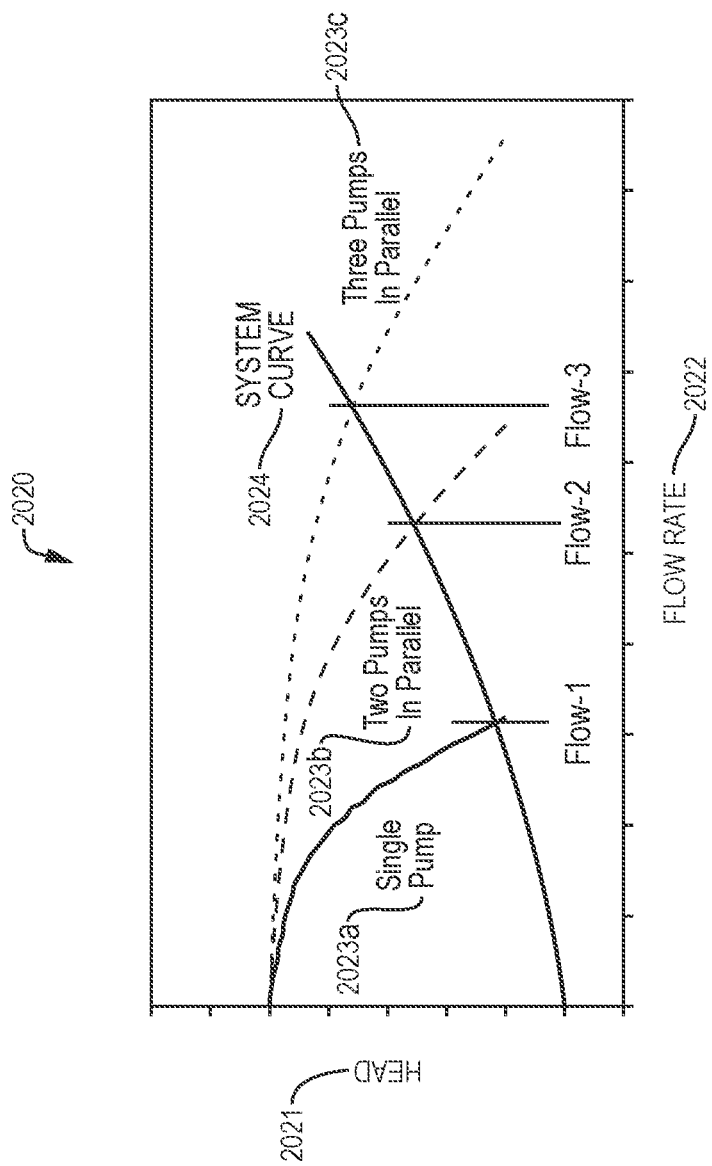
FIG. 20 is a plot showing head-flow curves for pumps in parallel that may be used by embodiments.

If identical pumps are connected in parallel, as is the case in the real-world illustrative example described herein, the characteristic curve of the system 2024 shown in FIG. 20, is similar to the curve for a single pump (Ulanicki, Bogumil & Kahler, Jens & Coulbeck, B. (2008). Modeling the Efficiency and Power Characteristics of a Pump Group. Journal of Water Resources Planning and Management-asce—J WATER RESOUR PLAN MAN-ASCE. 134. 10.1061/(ASCE)0733-9496(2008)134:1(88). In addition to the system curve 2024, the plot 2020 includes three H-Q curves (head 2021 versus flow rate 2022) for one 2023*a*, two 2023*b*, and three 2023*c* identical parallel pumps. The three curves 2023*a-c* obey the Quadratic/Cubic Polynomial Head-Flow model.

Pump Affinity Laws for Parallel Pumping System

The affinity laws and associated equations discussed above were for generating pump curves for a single pump operating over multiple different pump speeds. The same laws and equations can be used to generate multiple-pump-multiple speed pump curves as described below.

For pumps that fall under the Quadratic Power Law Head-Flow Model the following equations are used:

$H = aQ^2 + bQ + c$ Pump at nominal speed $H = a''Q^2 + b''Q + c''$ Pump at reduced speed for one or more pumps in a parallel pumping system (9)

The relationship between the Quadratic Polynomial Head-Flow Coefficients for nominal speed and reduced speed for the combined system in which the number of pumps k are operating is expressed as follows:

$a'' = a/k^2$ $b'' = (b/k) * n$ $c'' = c * (n^2)$ (10)

For pumps that fall under the Cubic Polynomial Head-Flow Model the following equations are used:

$H = aQ^3 + bQ^2 + cQ + d$ Pump at nominal speed $H = a''Q^3 + b''Q^2 + c''Q + d''$ Pump at reduced speed for one or more pumps in a parallel pumping system (11)

The relationship between Cubic Polynomial Head-Flow Coefficients for nominal speed and reduced speed is expressed as follows:

$a'' = (a/k^3)/n$ $b'' = b/k^2$ $c'' = (c/k) * n$ $d'' = d * n^2$ (12)

Individual pump efficiency is a function of pump flow and pump speed and is approximated by a fourth-order polynomial.

$\text{Eff} = eQ^4 + fQ^3 + gQ^2 + hQ + i$ Pump at nominal speed $\text{Eff} = e''Q^4 + f''Q^3 + g''Q^2 + h''Q + i''$ Pump at reduced speed for one or more pumps in a parallel pumping system (13)

The relationship between efficiency coefficients for nominal speed and reduced speed for the combined system in which the number of pumps k are operating is expressed as follows:

$e'' = e/(k^4 * n^4)$ $f'' = f/(k^3 * n^3)$ $g'' = g/(k^2 * n^2)$ $h'' = h/(k * n)$ $i'' = i$ (14)

Figure 21:
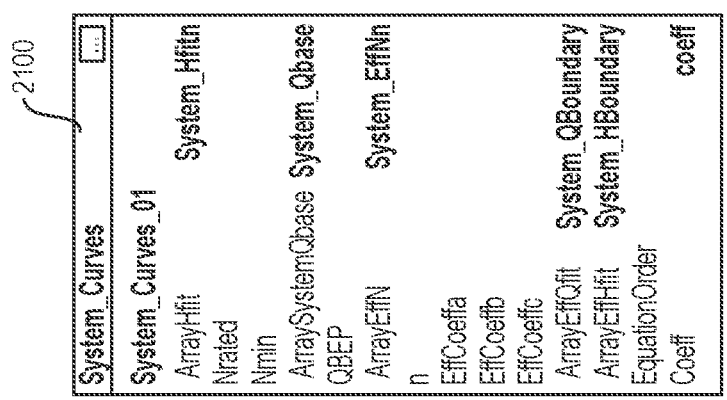
FIG. 21 illustrates an AOI used in a training phase of an embodiment.
Figure 22:
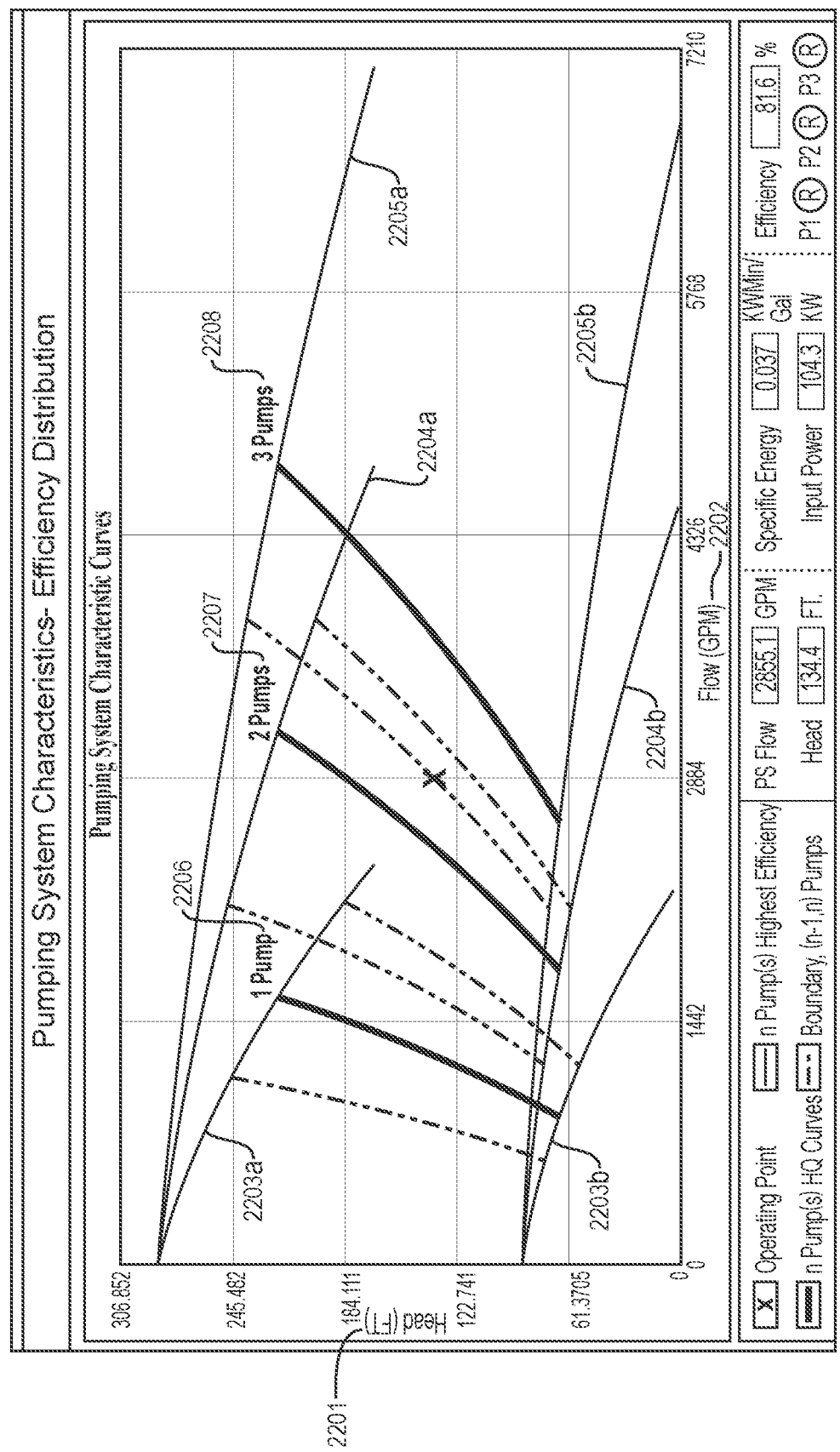
FIG. 22 is a plot depicting multiple pump characteristic curves determined in an embodiment.

Using the general polynomial regression model discussed in the previous section and multiple-pump-multiple-speed pump affinity laws described above, H-Q curves can be plotted for multiple pumps. An embodiment utilizes custom PLC code written to create an AOI that generates the multiple pump characteristic curve. An example AOI 2100 is shown in FIG. 21.

Each point on each curve generated by the AOI 2100 represents a specific efficiency value. The POR region for single pump operation or multiple pump operation can also be viewed in a plot of H-Q curves for the multiple pump system as shown in the plot 2200 of FIG. 22. The plot 2200 includes head 2201 versus flow 2202 for curves at 100% speed and 55% speed where one pump (curves 2203*a* and 2203*b*), two pumps (curves 2204*a* and 2204*b*), and three pumps (2205*a* and 2205*b*) are used. The efficiency lines 2206, 2207, and 2208 for the one pump, two pump, and three pump scenarios are also shown in the plot 2200.

Automatic Generation of Training Dataset

Embodiments use mathematical algorithms and techniques, as well as custom PLC code to estimate polynomial coefficients, extrapolate pump curve data from 100% speed to various other speed values (95%, 90%, etc.), generate pump curves for single and multiple pump pumping systems at various pump speeds, and plot the iso-efficiency lines to indicate the BEP and POR region of the pumping system.

Embodiments also utilize custom PLC code to create an AOI for the specific purpose of generating a complete system training data set for use by the AI neural network. The AOI uses the affinity laws and least square models to automatically generate the training dataset. Because the training data includes efficiency data extrapolated for the various different operating scenarios, e.g., different speeds and number of pumps, the training data set allows the AI to generate a model that is capable of predicting the pumping system efficiency for any combination of pumps running at any given speed and discharging at a specific flow rate for any real-time process condition instantaneously.

The training dataset for the real-world use case presented in this description includes pump characteristic curve data points for a one pump system, two-pump system, and a three-pump system operating at various pump speeds. There are three input variables, pumping system flow, pump speed, and combination of number of pumps running, and an output variable, efficiency. According to an embodiment, these values are transferred to the AI device for training the neural network model. FIG. 23 shows the PLC AOI 2300 that automatically generates the training dataset.

Creating a Model of the Pumping System in AI Device Using Neural Network

It is noted that model training is described herein as being done on a Jetson AI device, however, training can be can be done on any AI device or any computing device or combination of computing devices known in the art. For example, training may be done on devices using one or more Graphics Processing Units (GPUs). Typically, GPUs can complete model training faster, allowing the operational phase to commence sooner. Moreover, edge devices like the Jetson Xavier come with a less powerful GPU than those typically found in non-edge devices, but can perform model training tasks in a reasonable amount of time. For the real-world use case described herein, model training was performed on both the Jetson Xavier AI device and an Amazon Web Services (AWS) GPU machine running on EC2 instance.

Acquiring Training Dataset from the PLC

The Jetson AI device is a hardware device for embedded/edge computing solutions used in industrial applications and real-time systems. In order for this device to be ready to run the AI model, open source library packages such as Keras, Scikitlearn, pandas, etc. are installed. In an embodiment, a suitable Nvidia docker, which is a Python software with preinstalled libraries is also used.

The training dataset generated using the embodiment discussed earlier and depicted in FIG. 24 is sent over EtherNet to the Jetson Xavier AI Device. Raw data structures from the PLC are obtained efficiently and converted into highly customized attributes using the Python programming language. These attributes use the commands or methods declaration to access (read/write) any type of variables used in the PLC program. This is accomplished using custom-made Python code integrated along with an open-source Python library "pylogix" used in the Jetson AI Device to receive the training data set values from the PLC for model creation and training.

Figure 24:
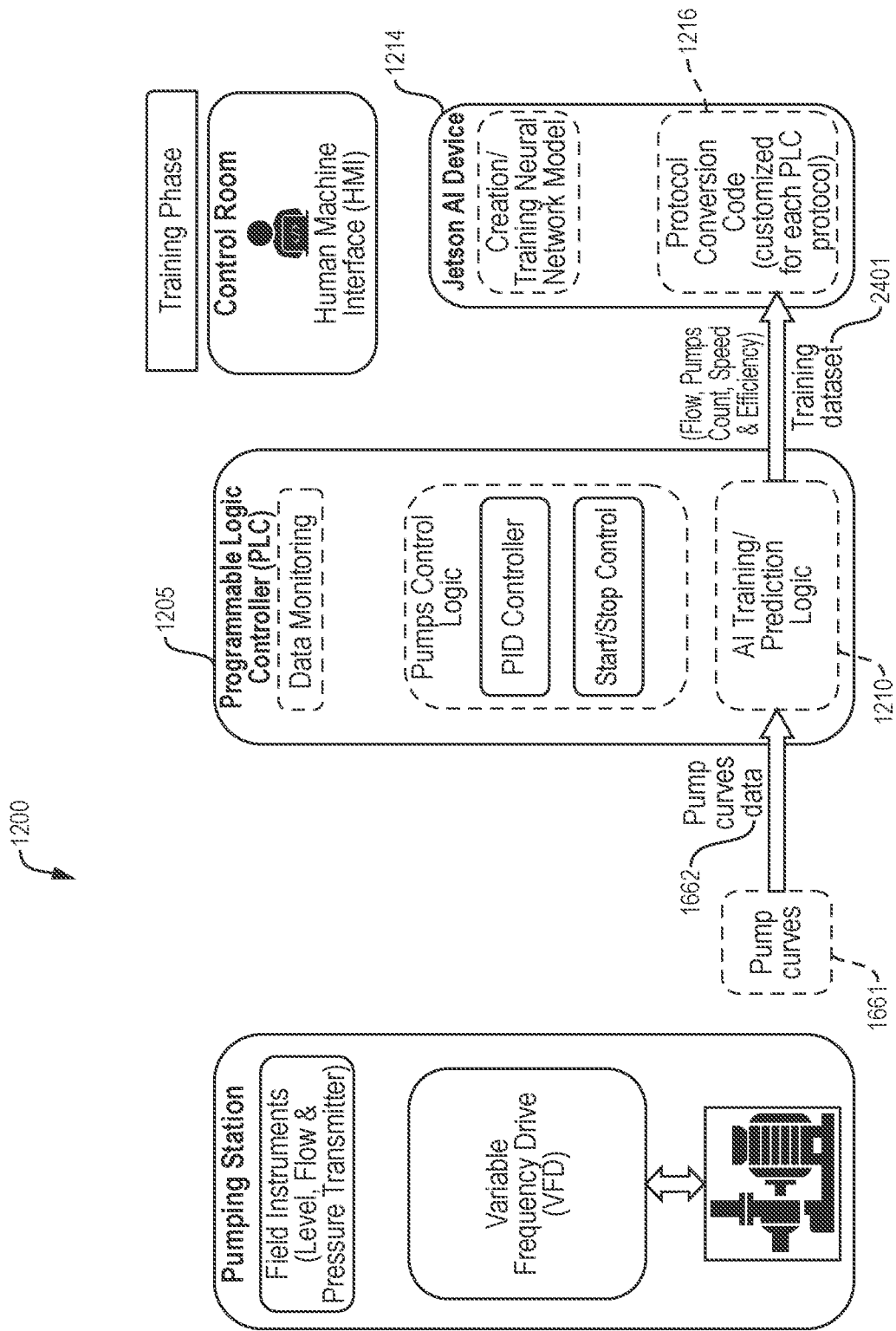
FIG. 24 is a block diagram illustrating a system creating a machine learning model according to an embodiment.

FIG. 24 expands upon FIG. 16 and shows the second step of the training phase. FIG. 24 depicts the training data set 2401 generated in the PLC 1205 by the AI training module 1210 being sent to the Jetson device 1214 conversion code module 1216. The conversion code module 1216 converts the training dataset 2401 from EtherNet/IP to EtherNet using protocol conversion code in Python 1216 programmed inside the Jetson AI device 1214.

Data Pre-Processing

Figure 25:
FIG. 25 is a sample training data set according to an embodiment.

The training data set that is generated from an AOI in the PLC is transferred to the AI device via a custom-made Python code integrated along with an open-source Python library as described in the previous section. FIG. 25 shows a sample illustration of the dataset 2500. The dataset 2500 shows the pump characteristics of flow 2501 and speed 2502 and resulting efficiencies for one pump 2503*a*, two pumps 2503*b*, and three pumps 2503*c*.

Once the training data sets are acquired by the AI device, an embodiment preprocesses the data. The preprocessing may include dropping samples with missing and/or out of range variable values. For instance, some combinations of flow and motor speed are not within the pump curve range for one pump running, but are valid for two and three pumps running. This results in invalid efficiency values that are dropped during the pre-processing.

To avoid issues while calculating training loss, and to give every variable equal importance, an embodiment scales the variables to have a mean of 0 and a standard deviation of 1 using the equation below which is coded into the AI device using Python.

$$x_{stand} = \frac{x - \text{mean}(x)}{\text{standard deviation}(x)}$$

Figure 26:
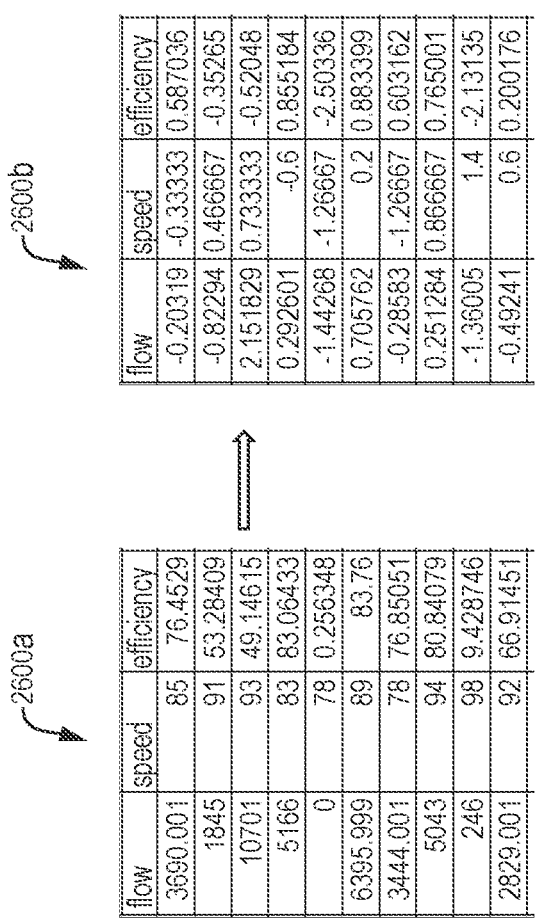
FIG. 26 illustrates training data standardization that may be employed in embodiments.

FIG. 26 illustrates an original dataset 2600*a* and a standardized dataset 2600*b* after the aforementioned standardization.

Building Artificial Neural Network Model

Embodiments can use any variety of machine learning methods to build the AI model to predict efficiency using the pump data. Such methods can include polynomial regression, Random forest regression, Xgboost, and Artificial Neural Networks amongst others.

Figure 27:
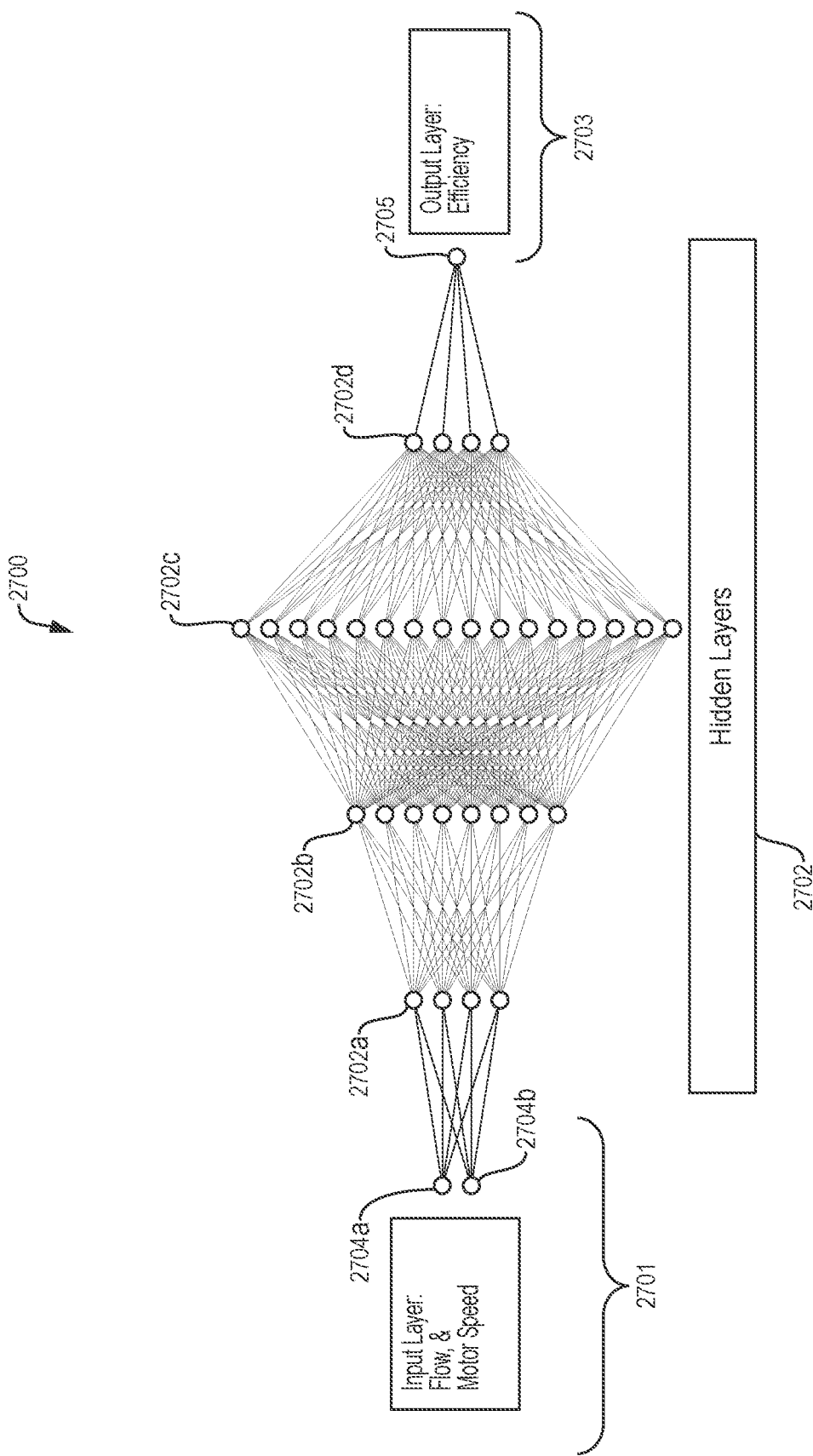
FIG. 27 is a depiction of an Artificial Neural Network (ANN) that may be employed in embodiments.

One such example embodiment uses the Artificial Neural Network (ANN) 2700 depicted in FIG. 27 as a base AI model. The ANN 2700 is composed of an input layer 2701 that takes pump characteristic data (flow and motor speed), hidden layers 2702*a-d*, and output layer 2703 that provides a prediction of efficiency. The input layer 2701 has two nodes 2704*a-b* for flow and motor speed. The hidden layers 2702*a-d* with 4, 8, 16, 4 nodes, respectively. The output layer 2703 has a single node 2705 which gives a single value of efficiency. In an embodiment, the ANN 2700 is trained according to methods known in the art, using the training data described herein.

Figure 28:
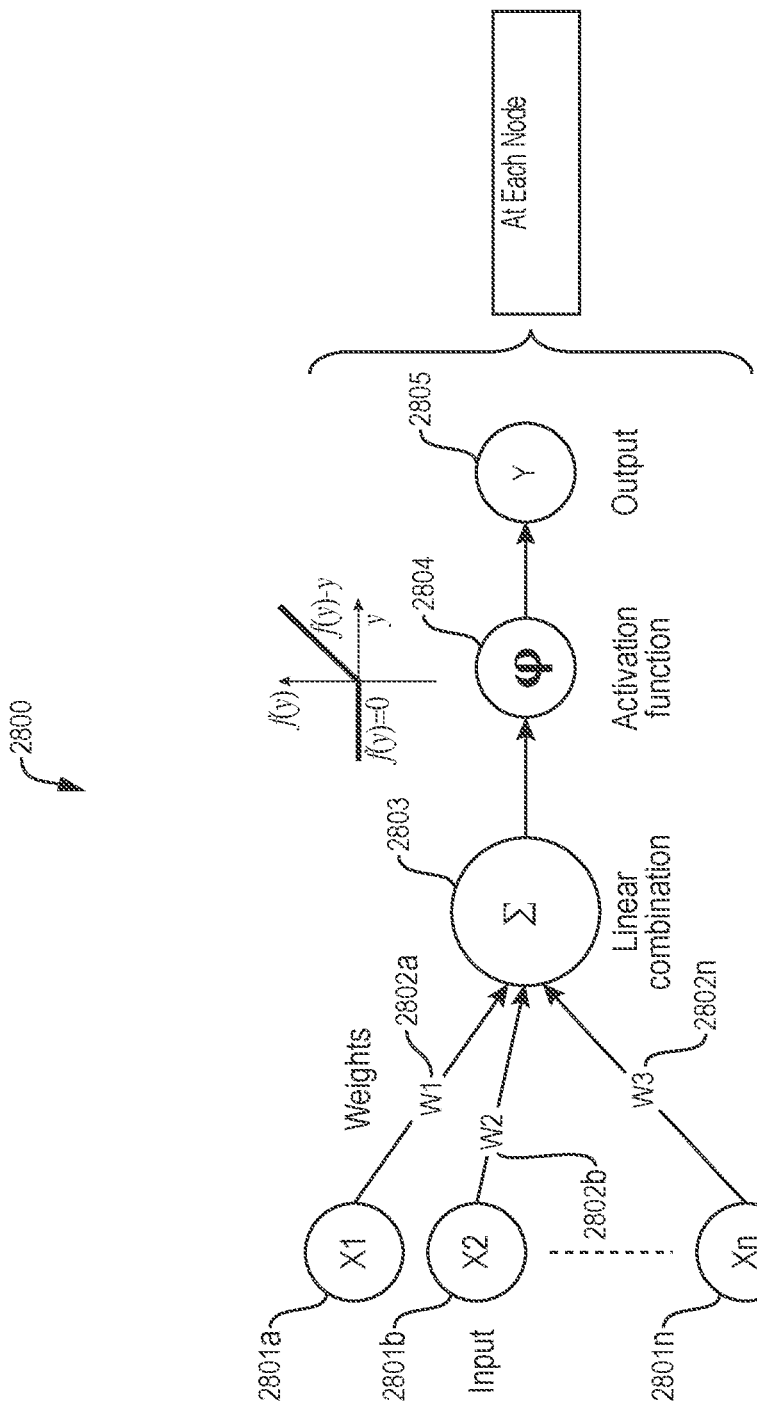
FIG. 28 is an overview of functionality implemented in nodes of the ANN of FIG. 27.

FIG. 28 illustrates a method 2800 implemented by each node, e.g., 2704a-b, of the ANN 2700. Each node receives input data 2801a-n and applies corresponding weights 2802a-n to calculate a weighted linear combination 2803 of the inputs 2801a-n. The weighted linear combination 2803 is then processed by the activation function 2804 to determine the output 2805 of the node, e.g., 2704a-b. This methodology 2800 is implemented at each node of the ANN 2700 with known inputs and known outputs (the training data) to configure the ANN to predict output given inputs. In an implementation, the training data composed of operation characteristics and efficiencies is processed by the ANN 2700 and weights, e.g., 2802a-n, are adjusted so that the ANN 2700 processes the inputs (operational characteristics) and generates an output 2705 that matches the known efficiencies.

In an example implementation, the model is developed in Python using the additional Python libraries keras, sklearn, and pandas. Before the model is trained, the training data set is split into a training and a testing data set. In an example implementation, the training dataset includes less than 1000 samples and, as such, 90% of the original training data is assigned to training and the remaining 10% is assigned as testing data.

In an example embodiment, three separate models are developed for three different pump running scenarios (1 pump running, 2 pumps running, and 3 pumps running) each having different flow, motor speed, and efficiency values. According to an embodiment, the number of nodes/layers for each model is based on cross-validation technique. An embodiment implements the neural network using a Rectified Linear Activation function or ReLU activation function, Root Mean Squared Propagation, or RMSProp optimizer and Mean Squared Error (MSE) loss function. The model is trained for 10000 epochs, best weights are selected using least validation stop loss.

Figure 29:
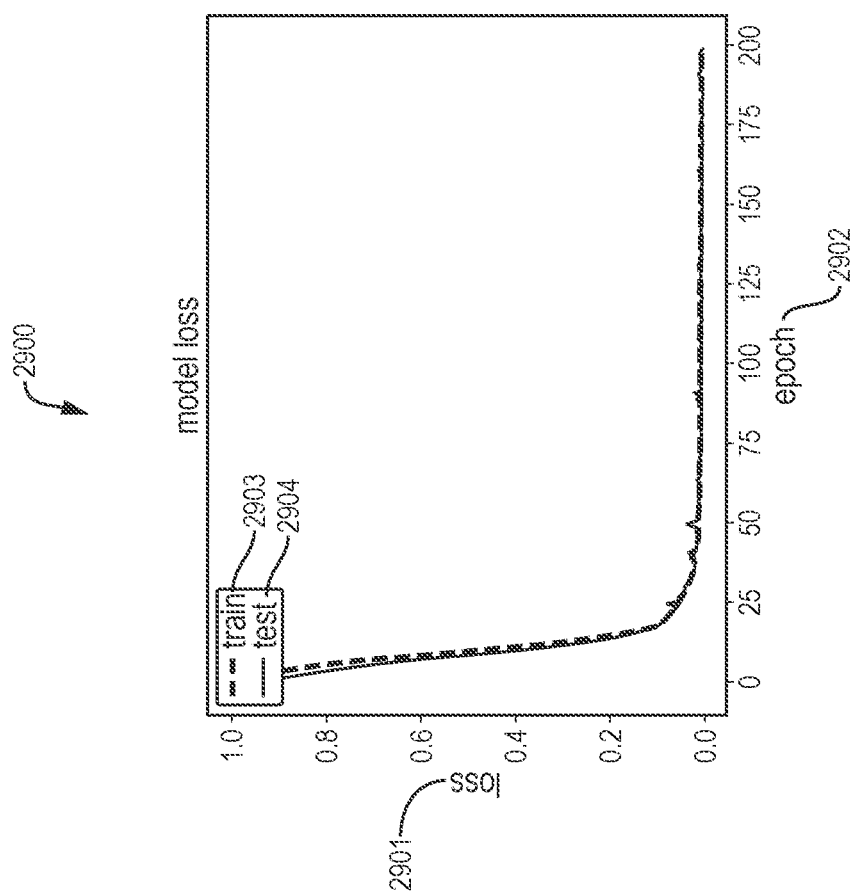
FIG. 29 is a plot of loss in a neural network according to an embodiment.

FIG. 29 is a plot 2900 of validation loss 2901 versus epochs 2902 for a model predicting efficiency for a scenario of three pumps running. The plot 2900 shows the loss 2901 versus epochs 2902 for the training data 2903 and testing data 2904. It can be observed in the plot 2900 that there is a good convergence as the number of epochs 2902 increases.

In the example implementation, the model had a testing root mean square error (RMSE) of 0.209, 0.098, 0.093 for the one pump running, two pumps running, and three pumps running scenarios, respectively. An embodiment also determines a metric called confidence % which is the average of % accuracy observed for each sample on testing data. This confidence % was observed to be 99.23%, 98.85%, 99.22% for the one pump running, two pumps running, and three pumps running scenarios, respectively.

Figure 30:
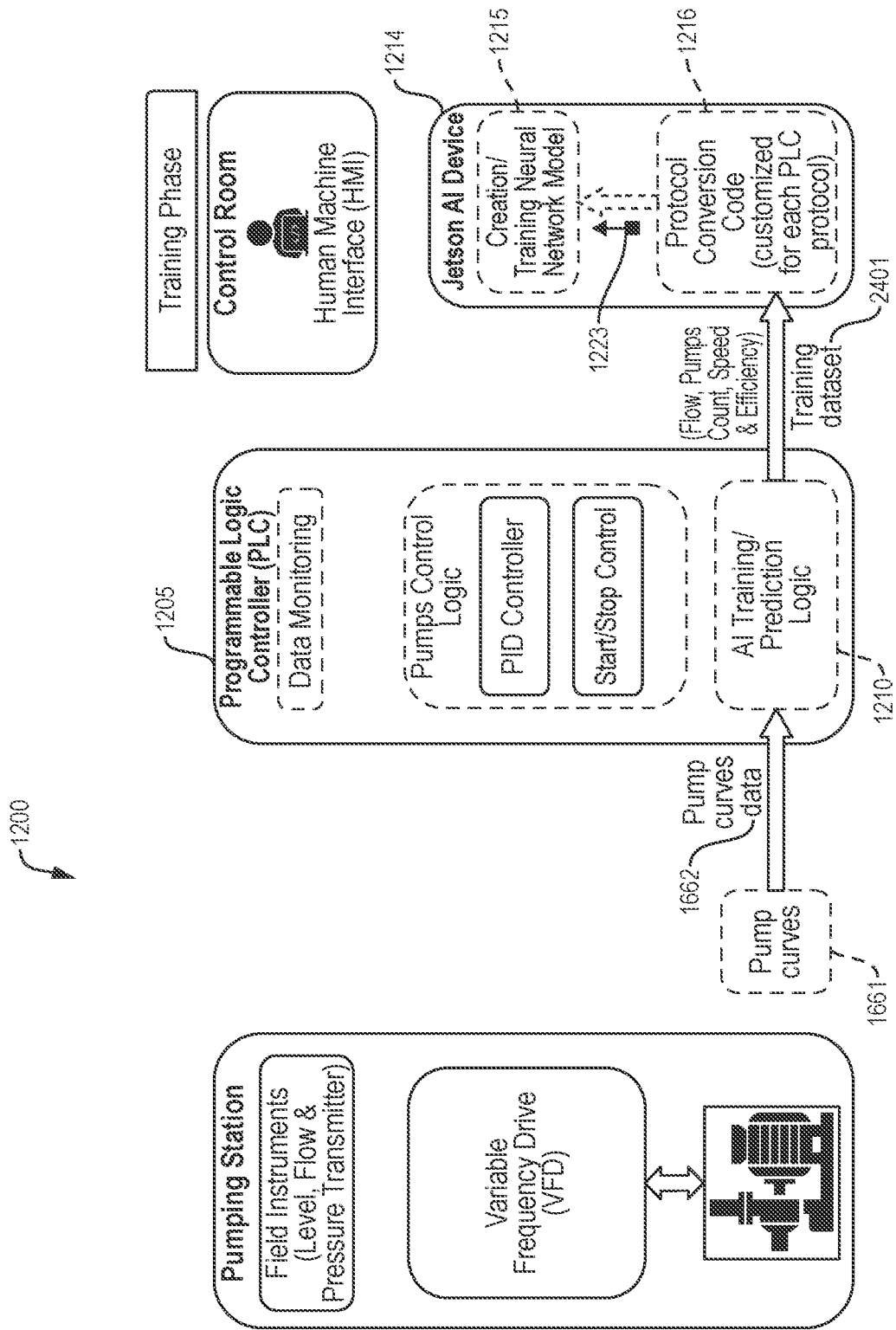
FIG. 30 is a block diagram of a system implementing protocol conversion and model training and creation according to an embodiment.

FIG. 30 expands upon FIG. 24, and shows the final step of the training phase. The training dataset 2401 was received from the PLC 1205 and sent to the protocol conversion module 1216. The module 1216 performs the conversion and sends the converted data 1223 to the training module 1215. The module 1215 creates and trains the neural network model.

Operational Phase

Once the aforementioned training phase is complete and a model capable of predicting pumping system efficiencies for any number of pumps running has been created, the device is ready to interface with the PLC and pump control logic. The following description details how, in an example embodiment, the predictions interface with the PLC to form a new way of controlling motor-driven equipment and systems.

Figure 31:
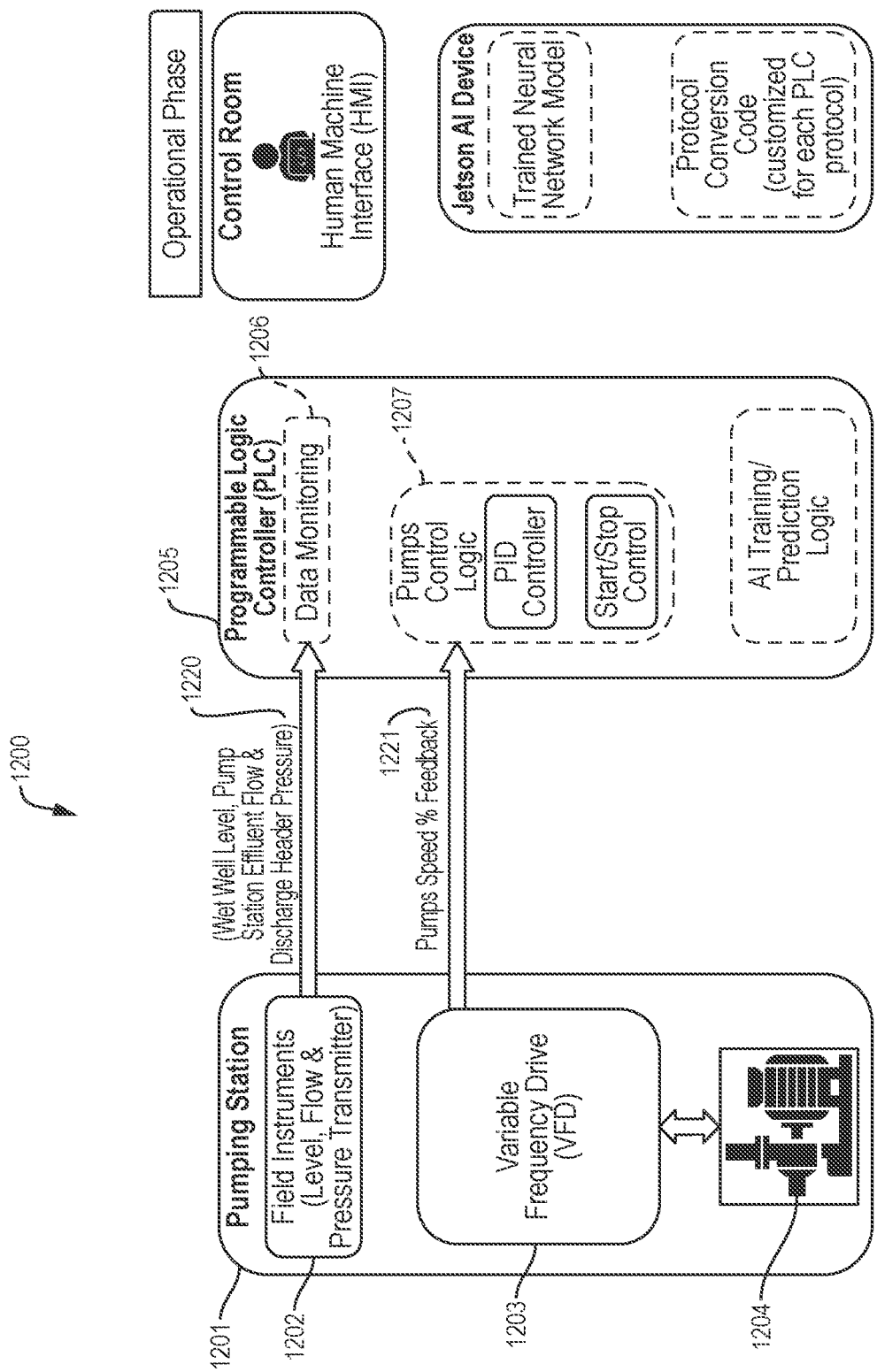
FIG. 31 is a block diagram showing a system embodiment implementing data integration.

FIG. 31 shows how the pumping station 1201 data is received at the PLC 1205 during the operational phase. In particular, field instruments 1202 send the field data 1220 to the data monitoring module 1206 of the PLC 1205. Similarly, the VFD 1203 of the pumping station 1201 sends the pump speed data 1221 to the pump control logic module 1207.

Figure 32:
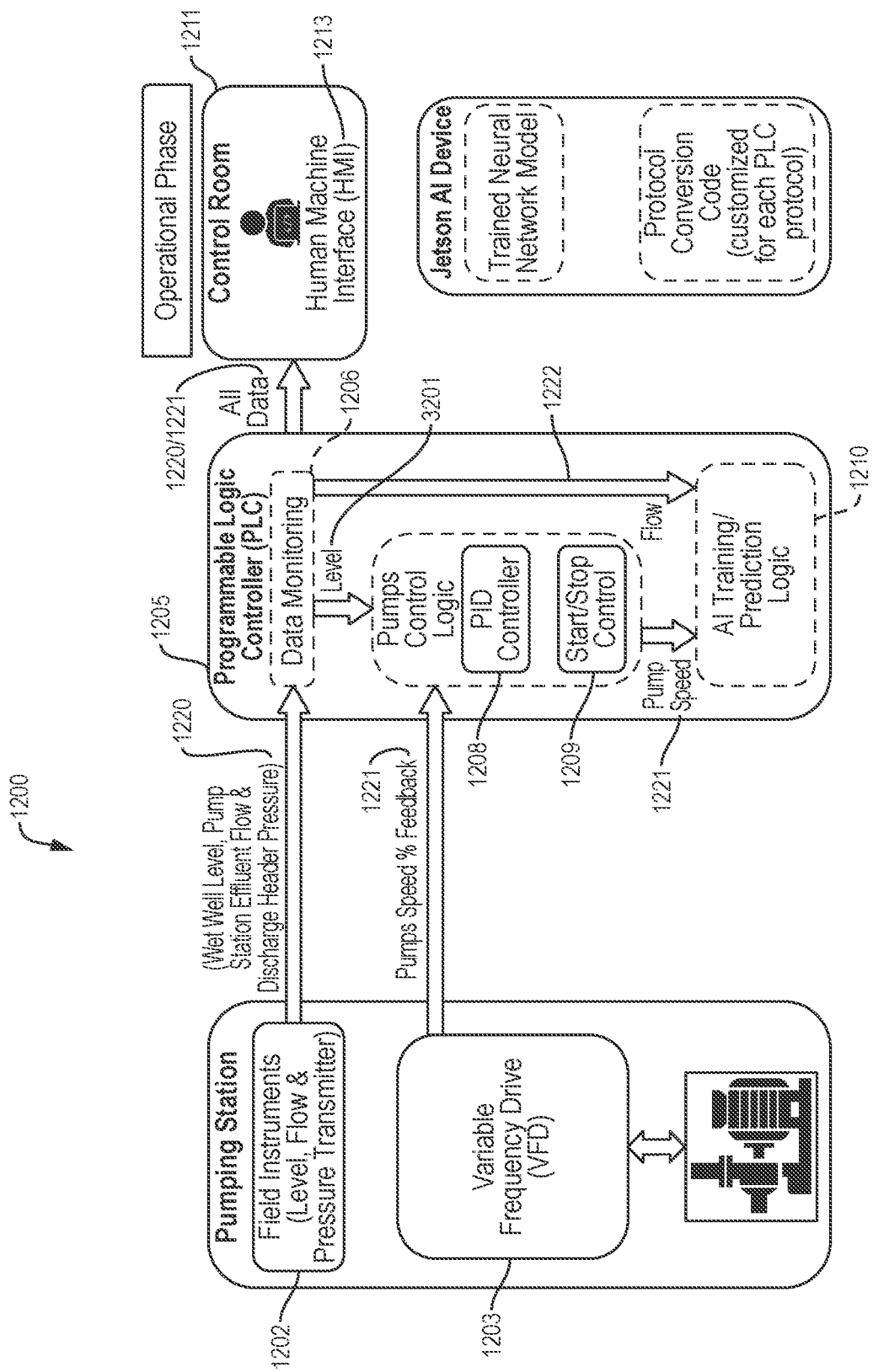
FIG. 32 is a block diagram showing an embodiment system using integrated data.

FIG. 32 shows how the various data points 1220 and 1221 from the field instruments 1202 and 1203 are sent within and from the PLC 1205. In the embodiment depicted in FIG. 32, data 1220 and 1221 is monitored and passed to the HMI 1213 of the control room 1211, but only some data, from amongst the data 1220 and 1221, is used by the AI logic 1210. In particular, level 3201 is sent from the data monitoring module 1206 to the PID controller 1208 of the pump control logic 1207, but level 3201 is not used by the AI logic 1210 in this embodiment. Meanwhile, pump speed 1221 and flow 1222 are sent to, and used by, the AI module 1210.

Figure 33:
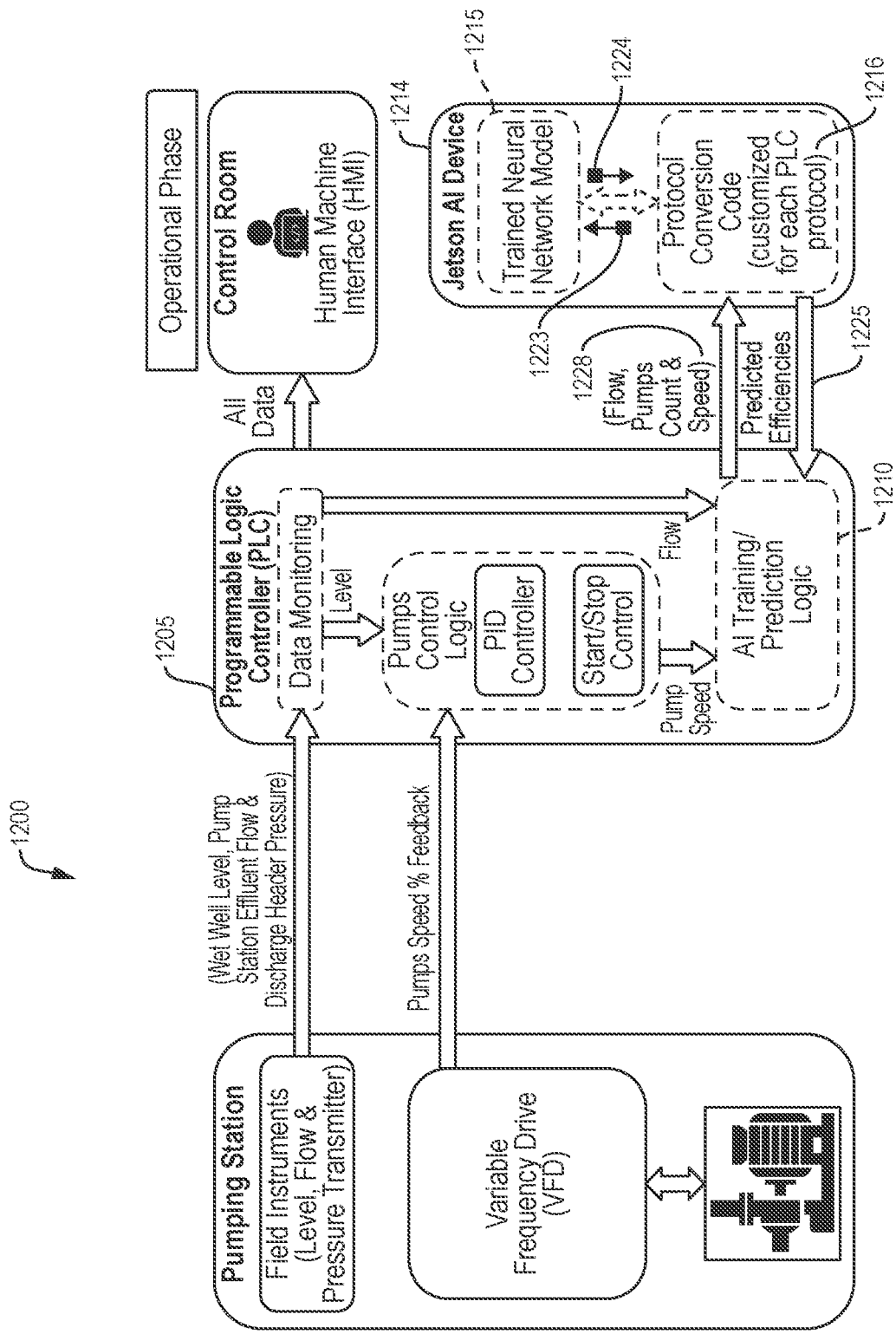
FIG. 33 is a block diagram showing a system communicating data to an AI device according to an embodiment.

FIG. 33 shows data 1228 from the field being communicated to the AI device 1214 and particularly, to the conversion code module 1216. The conversion module 1216 converts the data 1228 (which may be the pump speed 1221 and flow 1222) to EtherNet using the protocol conversion code to create the data 1223. The converted data 1223 is sent to the trained model 1215 which predicts efficiency 1224 and sends the predicted efficiency 1224 back to the conversion module 1216. The module 1216 converts the predicted efficiency 1224 to the predicted efficiency 1225 which is sent to the AI logic 1210 of the PLC 1205.

The performance of the model is validated using graphs to show the comparison between actual data and the model predicted data for different sample instances.

Figure 34:
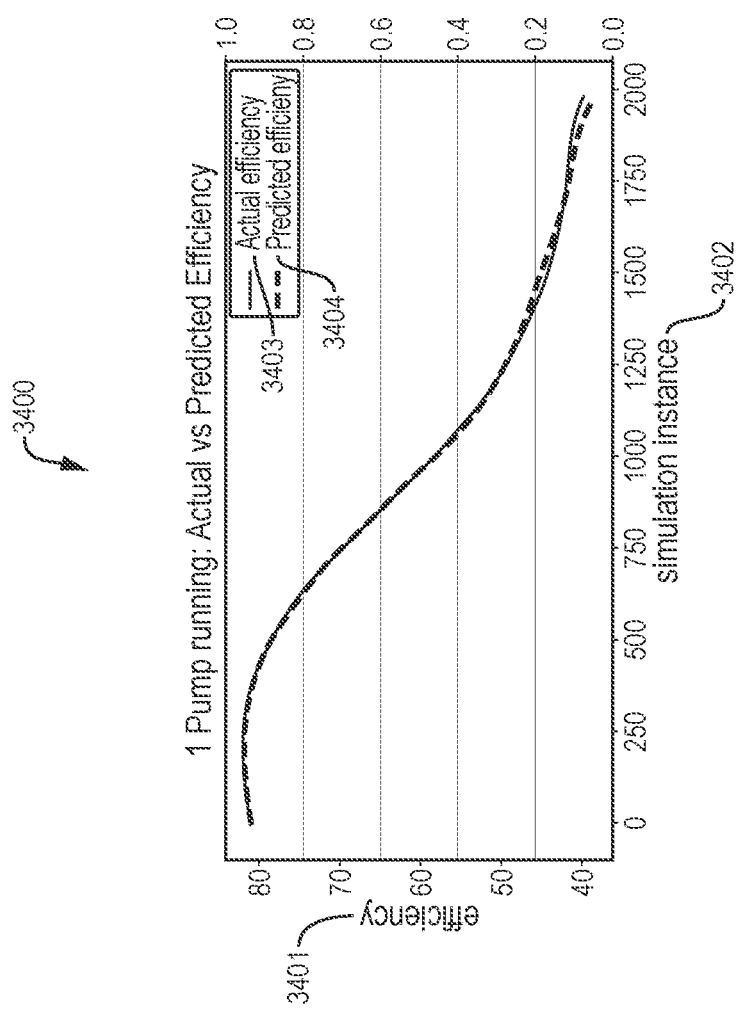
FIG. 34 is a plot showing predicted efficiency and actual efficiency for a single device operating in a system according to an embodiment.

The plot 3400 in FIG. 34 shows efficiency 3401 versus simulation instance 3402 for the one pump running scenario. The plot 3400 shows that actual efficiency 3403 and predicted efficiency 3404 are similar.

Figure 35:
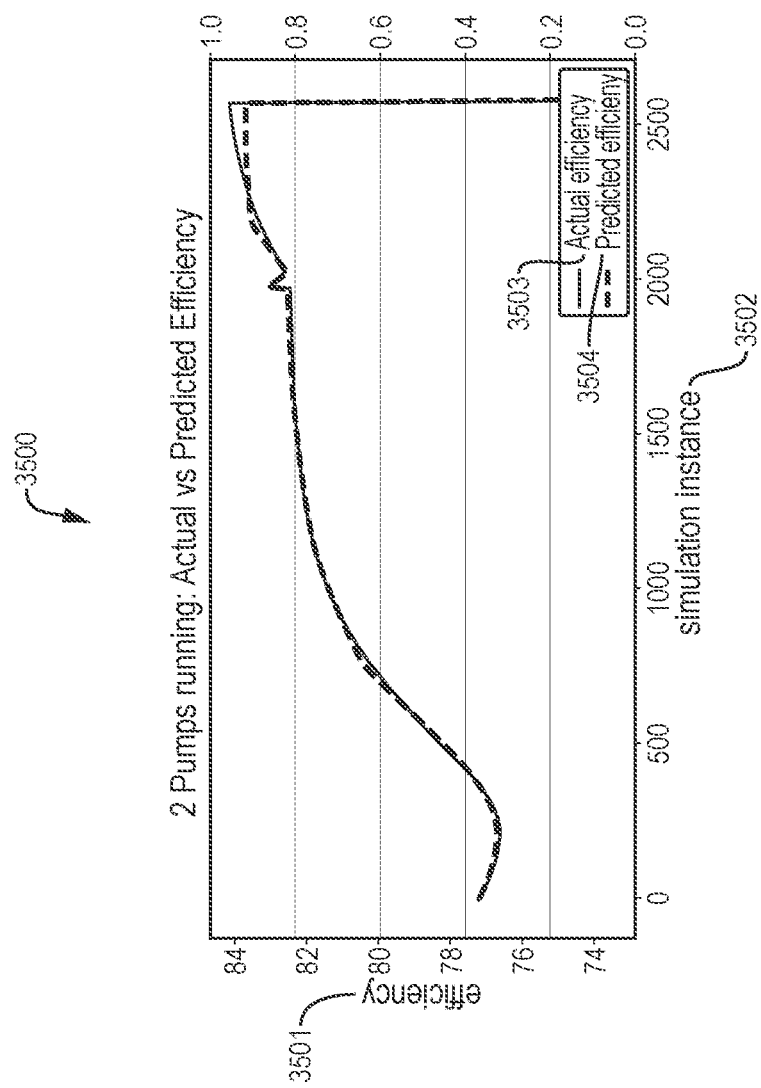
FIG. 35 is a plot showing predicted efficiency and actual efficiency for two devices operating in a system according to an embodiment.

In FIG. 35 the plot 3500 shows efficiency 3501 versus simulation instance 3502 for the two pumps running scenario. The plot 3500 shows that actual efficiency 3503 and predicted efficiency 3504 are similar.

Figure 36:
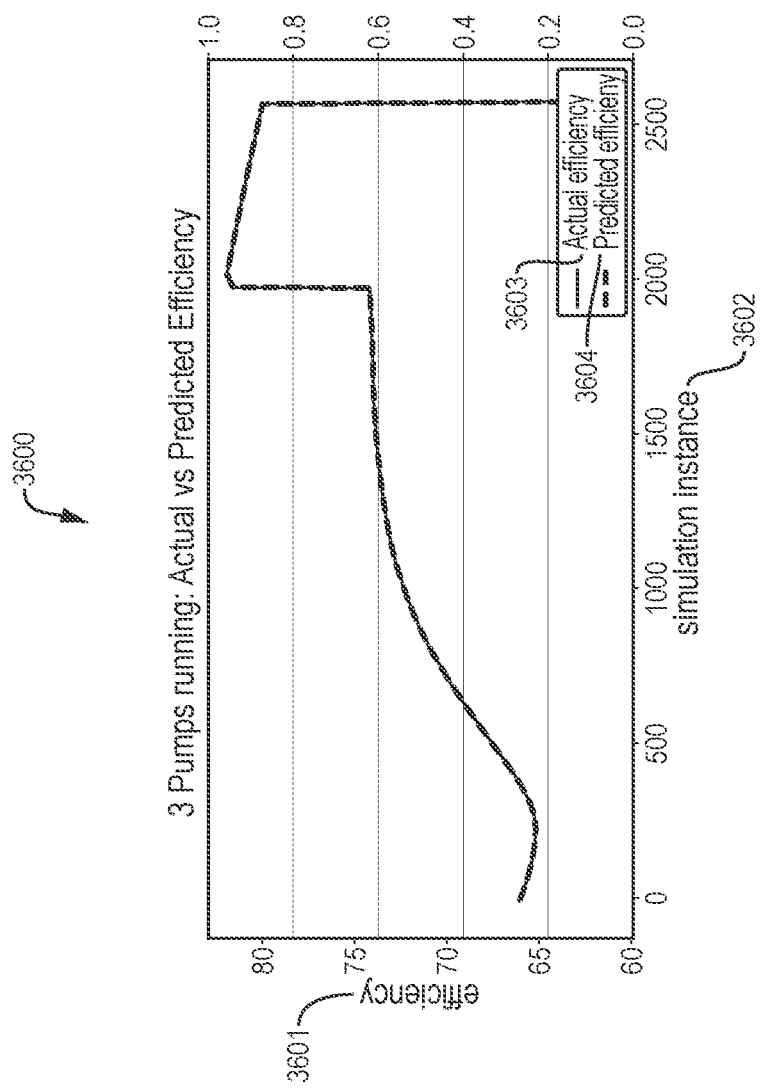
FIG. 36 is a plot showing predicted efficiency and actual efficiency for three devices operating in a system according to an embodiment.

Likewise, the plot 3600 in FIG. 36 shows efficiency 3601 versus simulation instance 3602 for the three pumps running scenario. The plot 3600 shows that actual efficiency 3603 and predicted efficiency 3604 are similar.

FIGS. 34, 35, and 36 show the comparison between actual efficiency and predicted efficiency values generated from the neural network models for one pump running, two pumps running, and three pumps running, respectively. The three predictions are applicable to the example real-world use case described here, but could return as many predictions as there are pumps or combination of pumps running in any other system if trained to do so. In embodiments, the predicted efficiencies are used by the prediction logic 1210 in the PLC 1205.

Figure 37:
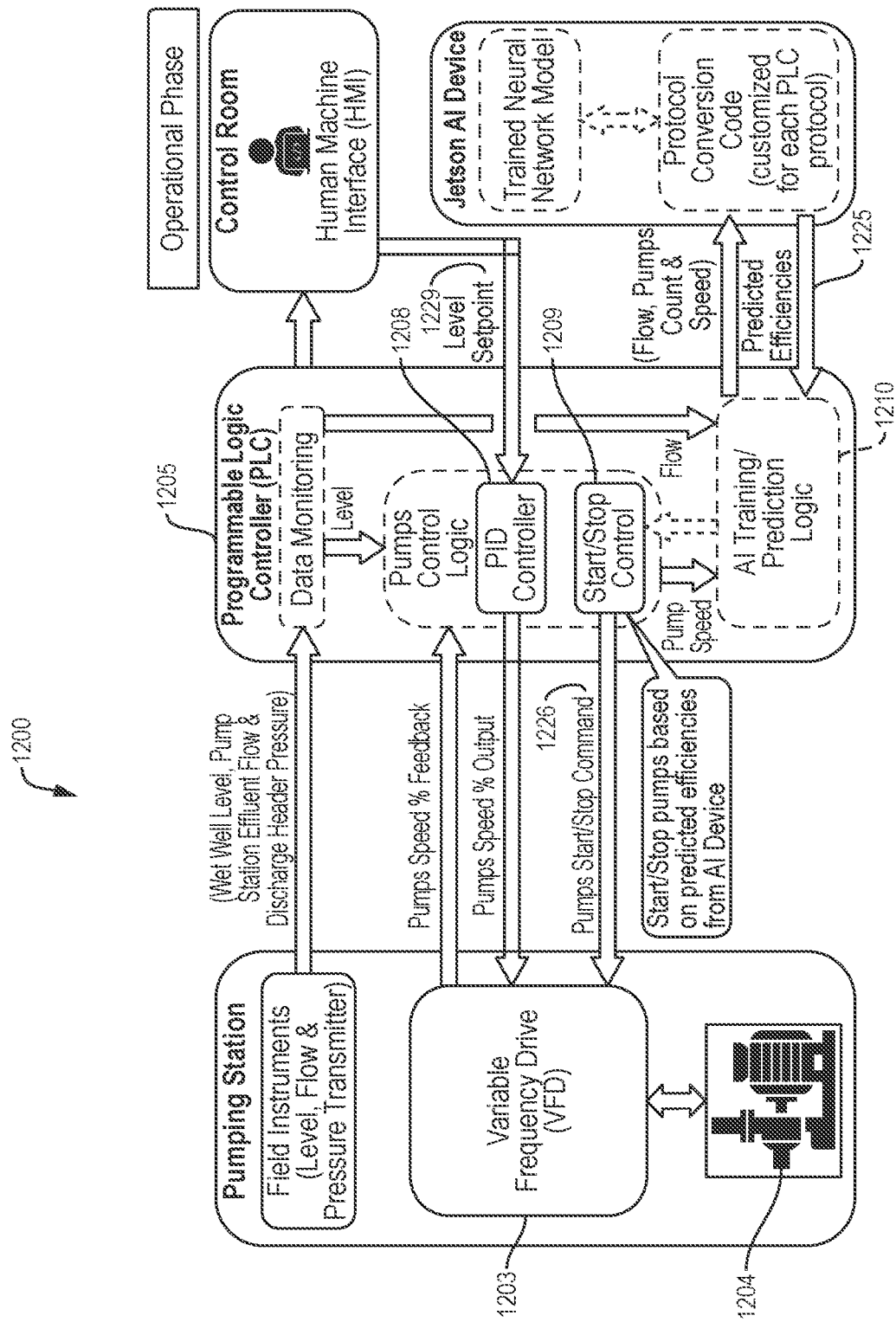
FIG. 37 is a block diagram showing a system utilizing an operator defined level setpoint in an embodiment.

FIG. 37 shows the operator defined level setpoint 1229 being received by PID controller 1208 of the PLC 1205. The PID level controller 1208 varies pump speed to maintain the desired level 1229. This is no different than the conventional method of programming and control described earlier in the document. However, unlike the existing methodologies, the predictions from the model 1215 are communicated to the PLC over Ethernet and compared to the BEP of the pumping system. The AI prediction logic in the PLC then determines when additional pumps should be turned on or off in order for the system to operate with optimal efficiency. In particular, predictions 1225 are used in the new method of programming and control 1210 to send start/stop commands 1226, via the start/stop controller 1209, to cause the VFD 1203 to turn on and off additional pumps 1204 in order to operate the pumping system 1220 as efficiently as possible.

According to an embodiment, the pump data from the PLC 1205 is read periodically every 2 seconds, the data received is preprocessed, and sent to the trained neural network model 1215. The neural network 1215 then returns three efficiency predictions 1225, efficiency for one pump running, two pumps running, and three pumps running, to the PLC 1205 via the protocol conversion code 1216.

Figure 38:
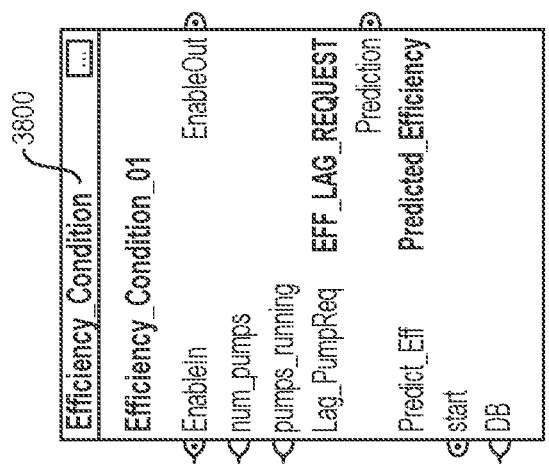
FIG. 38 is an AOI that determines an operating scenario according to an embodiment.

FIG. 38 depicts an AOI 3800 embodiment that is used to compare the predicted efficiencies, e.g., 1225, received from the AI device 1214, and determine a scenario of highest efficiency for the pumping system as a whole. Based on the determined most efficient scenario, the number of pumps are started/stopped by this embodiment to make sure the pumping system always operates with highest efficiency and closer to BEP.

Results

Figure 39:
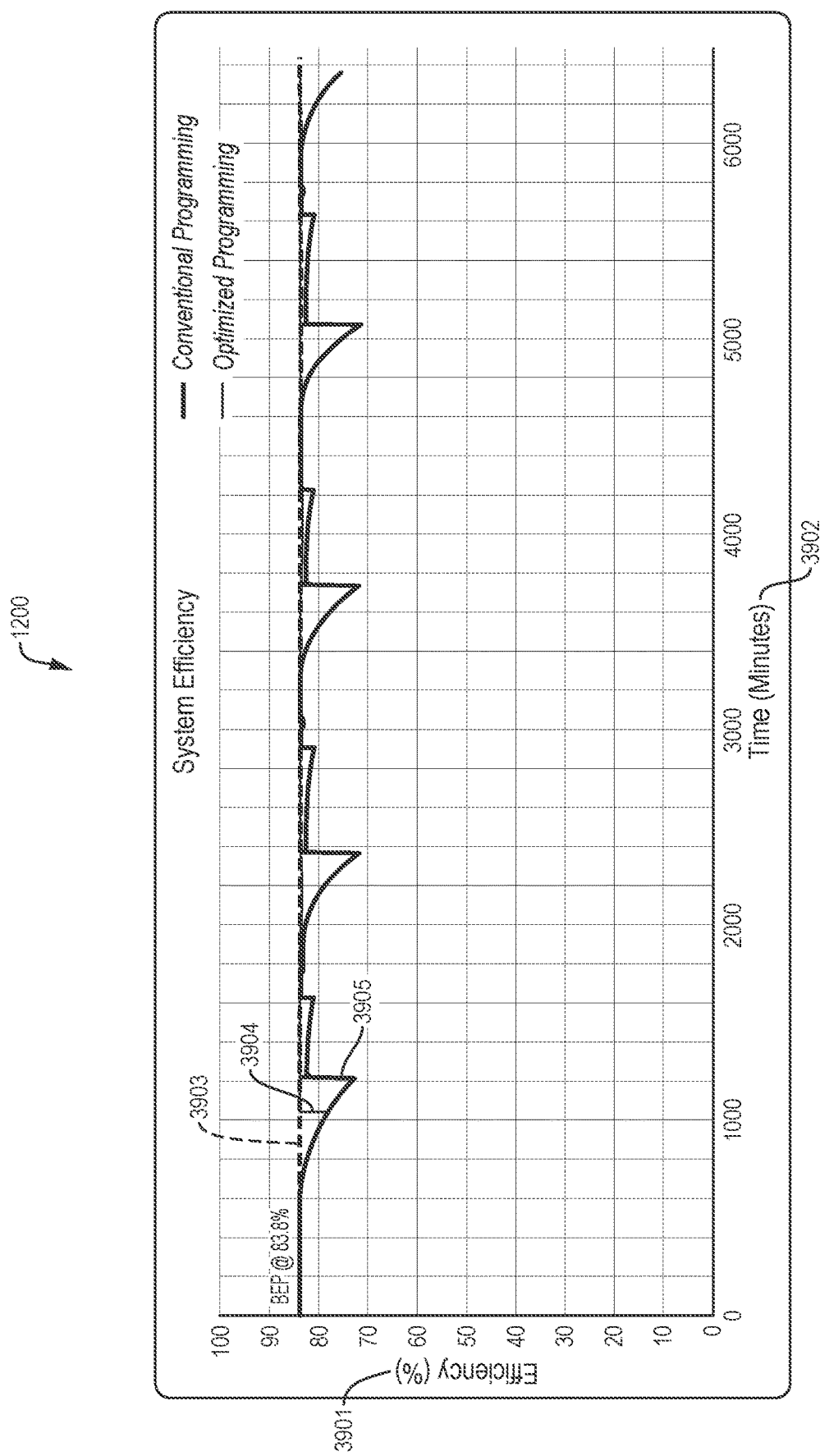
FIG. 39 is a plot showing efficiency results achieved by an embodiment.
Figure 40:
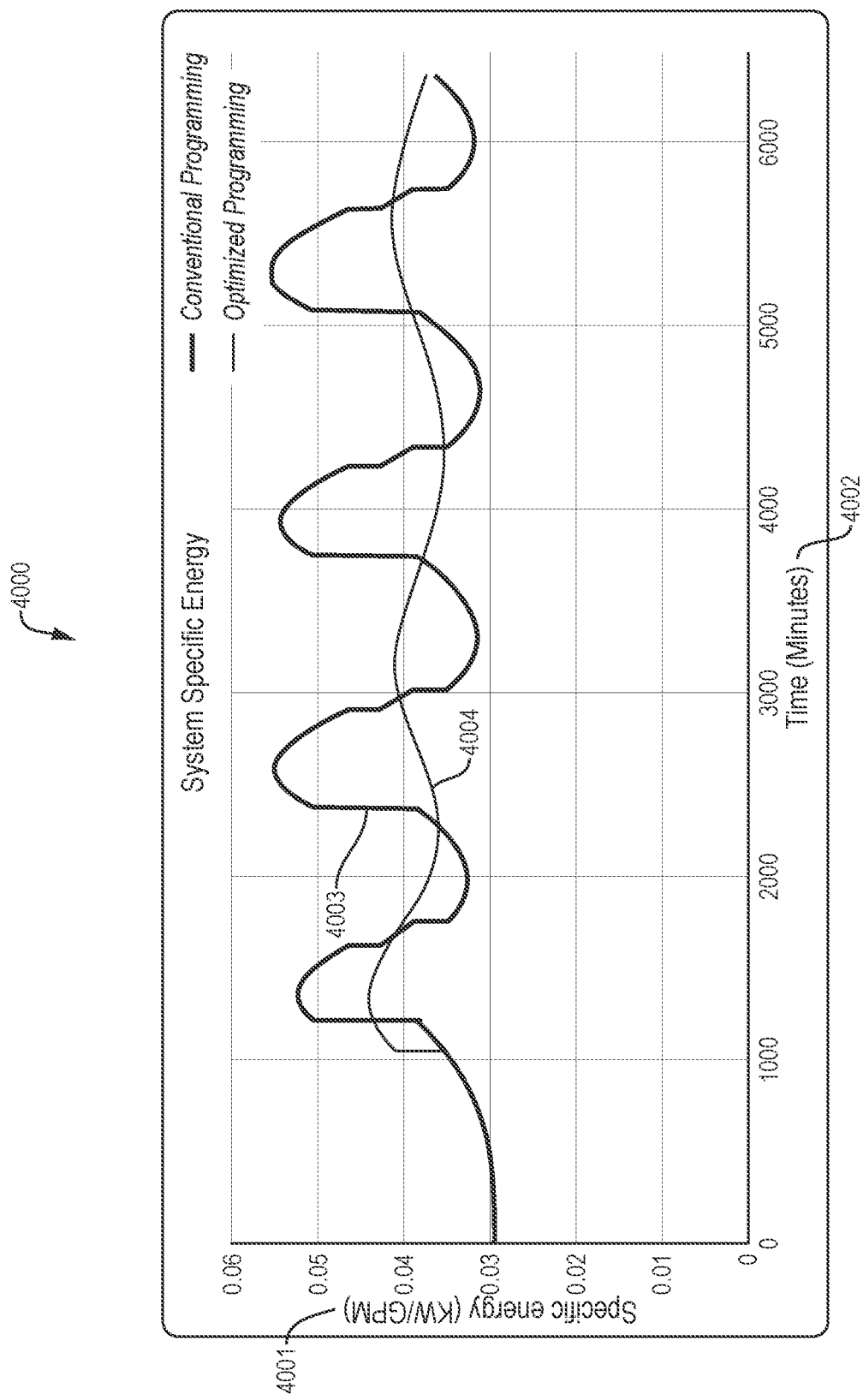
FIG. 40 is a plot showing energy consumption results achieved by an embodiment.

FIGS. 39 and 40 are plots 3900 and 4000 of system efficiency 3901 and specific energy consumption 4001 results for two simulations that were performed to demonstrate improvements of embodiments compared to existing methodologies. The plots 3900 and 4000 show efficiency 3901 and energy consumption 4001, respectively, versus time 3902 and 4002. The first simulation was implemented using the conventional method of programming and the second simulation was implemented using the embodiments described herein that use a Jetson AI device with neural network model. The input data used in these two simulations is the same, and was gathered from the SCADA system and manufacturer's literature for the real-world pumping system. Historical data from the SCADA system provided pump station flows allowing for a diurnal curve to be generated. This data was used to simulate influent flows throughout a 24-hour period. Additional SCADA data included typical pump speeds and associated wet well levels. Manufacturer pump curves were used to develop the training data set for the AI model.

The straight dashed line 3903 in FIG. 39 represents the BEP of the pumping system as defined by the manufacturer. The line 3904 represents the system being controlled using embodiments described herein. The line 3904 shows that the when the system is controlled using the embodiments described herein that use a Jetson AI device with neural network model, the system operates in an optimized mode and the pumping system operates extremely close to BEP 3903 for most of the time. The line 3905 represents operation of the system when controlled using the conventional method of programming that does not account for energy efficiency and does not include the embodiments described herein. The results show that embodiments provide a significant improvement to operational and mechanical efficiency of the pumping system. Mechanical strain on the pumping system is reduced by embodiments because embodiments maintain the operating point so close to BEP. In doing so, embodiments reduce operations and maintenance (O&M) costs by decreasing wear and tear on the mechanical components, thereby extending the mechanical life of the pumping system.

The line 4003 in FIG. 40 represents the specific energy consumption of the pumping system using the conventional method of programming. The line 4004 represents specific energy of the pumping system when the system is controlled using embodiments described herein. It can be seen in FIG. 40 by the line 4004 that the pumping system has a much smoother and lower specific energy consumption when the pumping system is controlled using the embodiments described herein that use a Jetson AI device with neural network model. This shows a significant improvement in the energy efficiency which results in savings by reducing electric utility bills.

Embodiments provide AI-based energy optimization functionality designed for use with PLC-based control systems. Embodiments optimize energy and mechanical efficiency of motor-driven equipment and/or systems. Embodiments provide a unique combination of numerous complex mathematical techniques, and methods used in conjunction with custom PLC and Python code that results in motor driven equipment and/or system optimization.

Embodiments of the invention provide a way for motor-driven equipment to operate as close as possible to BEP while still maintaining the process requirement. This results in significant energy cost savings, reduction in energy consumption, reduction in mechanical wear and tear on the equipment, reduced O&M costs, and extended mechanical life of the equipment.

The methods, techniques, custom code, and devices described herein utilize Artificial Intelligence (AI) to predict efficiency for any combination and number of mechanical systems, e.g., pumps, running in real time. While particular embodiments are described herein in relation to a pumping system, embodiments are not so limited and can be utilized to control any desired motor driven equipment and systems. Using a real-world use case as an example, the description herein shows how embodiments provide data to a control system that allows for a significant upgrade and change in how a pumping system is controlled. The traditional methods of maintaining the process requirement(s) are maintained, but the optimized efficiency prediction generated by embodiments is fed into custom PLC code that selects the number of pumps to run, and which pumps to run (if the pumps are different) so as to achieve optimized efficiency. As a result, a significant cost savings in terms of both energy and maintenance is realized.

It is noted that while embodiments are described as utilizing particular devices in a particular configuration, embodiments are not limited to such implementations. For instance, embodiments can be implemented using various edge devices.

Figure 41:
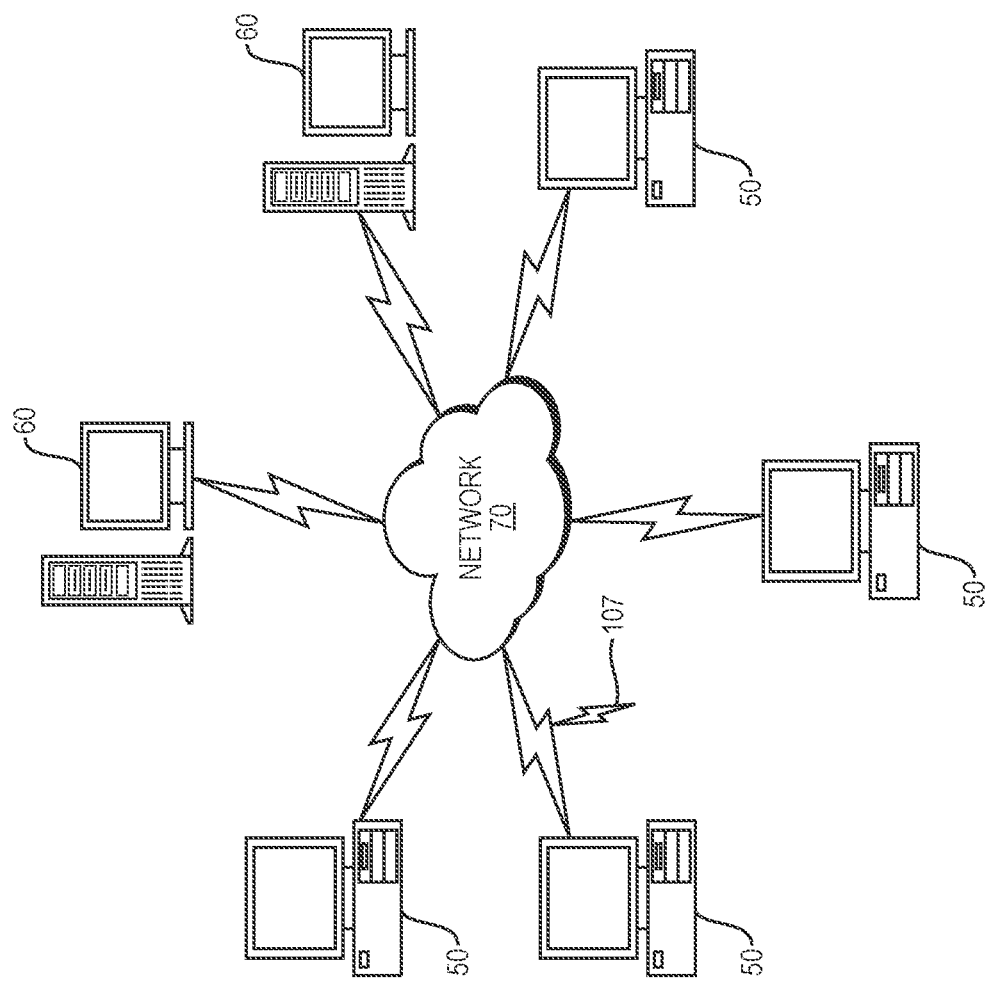
FIG. 41 illustrates a computer network or similar digital processing environment in which embodiments may be implemented.

FIG. 41 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 and/or servers 60 may be configured, alone or in combination, to implement the embodiments described herein, e.g., the method 1000, amongst other examples. The server computers 60 may not be separate server computers but part of cloud network 70.

Figure 42:
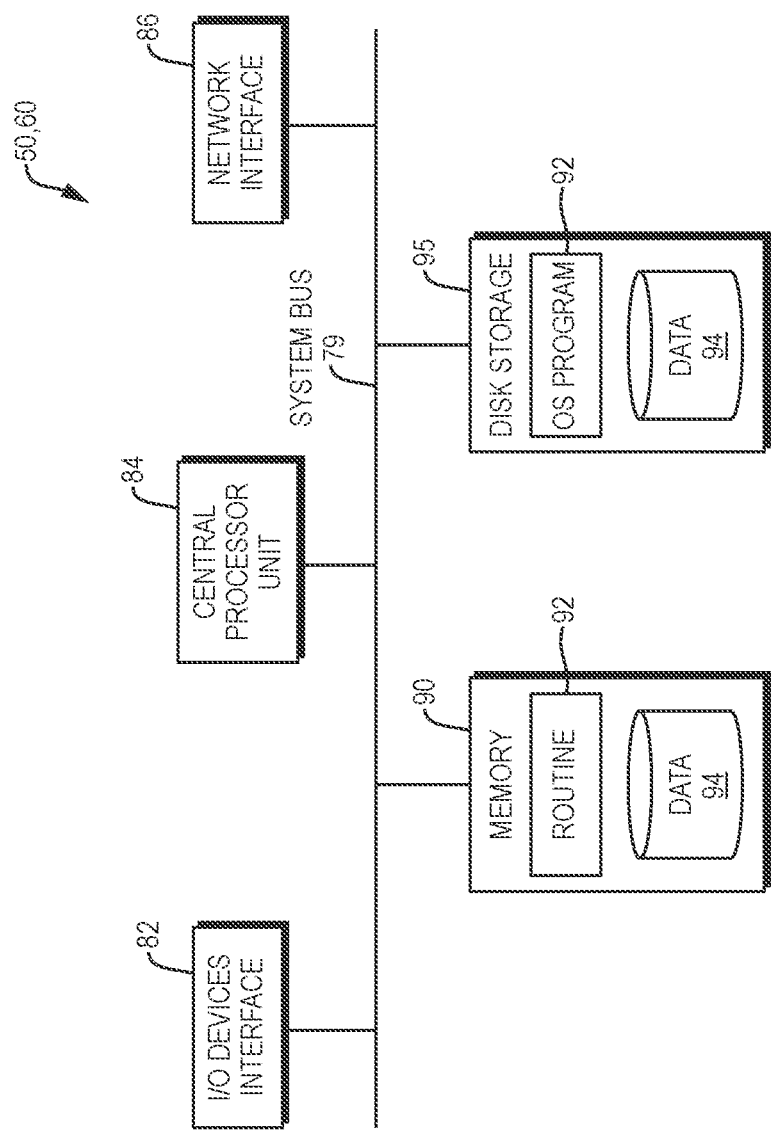
FIG. 42 is a diagram illustrating an example internal structure of a computer in the environment of FIG. 41.

FIG. 42 is a diagram of an example internal structure of a computer (e.g., client processor/device 50 or server computers 60) in the computer system of FIG. 41. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 41). Memory 90 provides volatile storage for computer software instructions 92 and data 94 used to implement an embodiment of the present disclosure (e.g., the method 1000, amongst others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for creating a neural network model for real-world mechanical system control, the method comprising:

extracting (i) an indication of efficiency and (ii) values of operational characteristics of a plurality of devices from a plurality of characteristic curves, wherein each characteristic curve corresponds to a respective device of the plurality of devices, in the mechanical system, functioning at a given speed, the plurality of devices including a plurality of device types;

creating a training dataset by determining efficiency and values of the operational characteristics for the mechanical system functioning with multiple combinations of the plurality of devices operating at each speed from a set of a plurality of speeds using the extracted indication of efficiency, the extracted values of the operational characteristics, and one or more physics-based laws that indicate changes to the operational characteristics as a function of speed of the plurality of devices, wherein determining the values of the operational characteristics using the one or more physics based laws comprises: (a) calculating coefficients for a plurality of polynomial equations by fitting the extracted values of the operational characteristics to the plurality of polynomial equations, wherein (i) the polynomial equations are indicated by the one or more physics based laws and (ii) each of the plurality of polynomial equations indicates values of the operational characteristics for the mechanical system as a function of speed of the plurality of devices and (b) using the calculated coefficients in at least a subset of the plurality of polynomial equations to determine the values of the operational characteristics for the mechanical system functioning with multiple combinations of the plurality of devices operating at each speed from the set of the plurality of speeds;

training a neural network model with the created training dataset, wherein the training configures the neural network model to predict efficiency of the mechanical system based on operating data; and deploying the trained neural network model to control operation of the mechanical system by:

processing real-time operating data for the mechanical system with the trained neural network model to predict efficiency of the mechanical system operating in accordance with each of a plurality of operating scenarios;

based on the predicted efficiency of each of the plurality of operating scenarios, selecting a given operating scenario of the plurality of operating scenarios, the selected operating scenario including a number of devices of the plurality of devices and an indication of which device types to operate of the plurality of device types; and controlling the mechanical system in accordance with the selected operating scenario.

2. The method of claim 1 wherein the operational characteristics include at least one of: head-flow (H-Q) data, best efficiency point (BEP), system flow at BEP, and rated rotations per minute (RPM).

3. The method of claim 1 wherein the values of the operational characteristics for the mechanical system functioning with multiple combinations of the plurality of devices operating at each speed from a set of a plurality of speeds are further determined using regression analysis.

4. The method of claim 1 wherein the one or more physics-based laws include affinity law equations.

5. The method of claim 1 wherein the mechanical system is a pump or blower system driven by a variable frequency drive device.

6. The method of claim 1 wherein the deploying the trained neural network model comprises:
embedding the trained neural network model into an edge device, wherein the edge device is communicatively coupled to the mechanical system to facilitate the control of the mechanical system.

7. The method of claim 1 wherein the neural network model is an Artificial Neural Network (ANN) model.

8. The method of claim 1 wherein the trained neural network model is configured to predict efficiency of the mechanical system during operation performed using a subset of the plurality of devices in the mechanical system.

9. The method of claim 8 further comprising:
training a plurality of neural network models with the training dataset, wherein each neural network model of the plurality predicts efficiency of the mechanical system based on operating data corresponding to the mechanical system operating using a respective unique subset of the plurality of devices in the mechanical system.

10. The method of claim 1, further comprising:
prior to processing the real-time operating data, converting a format of the real-time operating data to a format compatible with the trained neural network model.

11. A computer system for creating a neural network model for real-world mechanical system control, the computer system comprising:
a processor; and
a memory with computer code instructions stored thereon, the processor and the memory, with the computer code instructions, being configured to cause the system to:
extract (i) an indication of efficiency and (ii) values of operational characteristics of a plurality of devices from a plurality of characteristic curves, wherein each characteristic curve corresponds to a respective device of the plurality of devices, in the mechanical system, functioning at a given speed, the plurality of devices including a plurality of device types;
create a training dataset by determining efficiency and values of the operational characteristics for the mechanical system functioning with multiple combinations of the plurality of devices operating at each speed from a set of a plurality of speeds using the extracted indication of efficiency, the extracted values of the operational characteristics, and one or more physics-based laws that indicate changes to the operational characteristics as a function of speed of the plurality of devices, wherein determining the values of the operational characteristics using the one or more physics based laws comprises: (a) calculating coefficients for a plurality of polynomial equations by fitting the extracted values of the operational characteristics to the plurality of polynomial equations, wherein (i) the polynomial equations are indicated by the one or more physics based laws and (ii) each of the plurality of polynomial equations indicates values of the operational characteristics for the mechanical system as a function of speed of the plurality of devices and (b) using the calculated coefficients in at least a subset of the plurality of polynomial equations to determine the values of the operational characteristics for the mechanical system functioning with multiple combinations of the plurality of devices operating at each speed from the set of the plurality of speeds;
train a neural network model with the created training dataset, wherein the training configures the neural network model to predict efficiency of the mechanical system based on operating data; and
deploy the trained neural network model to control operation of the mechanical system by:
processing real-time operating data for the mechanical system with the trained neural network model to predict efficiency of the mechanical system operating in accordance with each of a plurality of operating scenarios;
based on the predicted efficiency of each of the plurality of operating scenarios, selecting a given operating scenario of the plurality of operating scenarios, the selected operating scenario including a number of devices of the plurality of devices and an indication of which device types to operate of the plurality of device types; and
controlling the mechanical system in accordance with the selected operating scenario.

12. The computer system of claim 11 wherein the processor and the memory, with the computer code instructions, are further configured to cause the system to:
train a plurality of neural network models with the training dataset, wherein each neural network model of the plurality predicts efficiency of the mechanical system based on operating data corresponding to the mechanical system operating using a respective unique subset of the plurality of devices in the mechanical system.

13. A computer program product for creating a neural network model for real-world mechanical system control, the computer program product comprising:
one or more non-transitory computer-readable storage devices and program instructions stored on at least one of the one or more storage devices, the program instructions, when loaded and executed by a processor, cause an apparatus associated with the processor to:
extract (i) an indication of efficiency and (ii) values of operational characteristics of a plurality of devices from a plurality of characteristic curves, wherein each characteristic curve corresponds to a respective device of the plurality of devices, in the mechanical system, functioning at a given speed, the plurality of devices including a plurality of device types;
create a training dataset by determining efficiency and values of the operational characteristics for the mechanical system functioning with multiple combinations of the plurality of devices operating at each speed from a set of a plurality of speeds using the extracted indication of efficiency, the extracted values of the operational characteristics, and one or more physics-based laws that indicate changes to the operational characteristics as a function of speed of the plurality of devices, wherein determining the values of the operational characteristics using the one or more physics based laws comprises: (a) calculating coefficients for a plurality of polynomial equations by fitting the extracted values of the operational characteristics to the plurality of polynomial equations, wherein (i) the polynomial equations are indicated by the one or more physics based laws and (ii) each of the plurality of polynomial equations indicates values of the operational characteristics for the mechanical system as a function of speed of the plurality of devices and (b) using the calculated coefficients in at least a subset of the plurality of polynomial equations to determine the values of the operational characteristics for the mechanical system functioning with multiple combinations of the plurality of devices operating at each speed from the set of the plurality of speeds;

train a neural network model with the created training dataset, wherein the training configures the neural network model to predict efficiency of the mechanical system based on operating data; and deploy the trained neural network model to control operation of the mechanical system by:
  processing real-time operating data for the mechanical system with the trained neural network model to predict efficiency of the mechanical system operating in accordance with each of a plurality of operating scenarios;
  based on the predicted efficiency of each of the plurality of operating scenarios, selecting a given operating scenario of the plurality of operating scenarios, the selected operating scenario including a number of devices of the plurality of devices and an indication of which device types to operate of the plurality of device types; and
  controlling the mechanical system in accordance with the selected operating scenario.

14. A method of controlling a mechanical system, the method comprising:
  obtaining real-time operating data for the mechanical system;
  processing the obtained real-time operating data with a trained neural network model to predict efficiency of the mechanical system operating in accordance with each of a plurality of operating scenarios, wherein the neural network model is: (i) configured to predict efficiency of the mechanical system based on operating data and (ii) trained using a dataset created by determining efficiency and values of operational characteristics for the mechanical system functioning with multiple combinations of a plurality of devices operating at each speed from a set of a plurality of speeds using an indication of efficiency and values of the operational characteristics extracted from a plurality of characteristic curves of the plurality of devices, and one or more physics-based laws that indicate changes to the operational characteristics as a function of speed of the plurality of devices, wherein determining the values of the operational characteristics using the one or more physics based laws comprises: (a) calculating coefficients for a plurality of polynomial equations by fitting the extracted values of the operational characteristics to the plurality of polynomial equations, wherein (i) the polynomial equations are indicated by the one or more physics based laws and (ii) each of the plurality of polynomial equations indicates values of the operational characteristics for the mechanical system as a function of speed of the plurality of devices and (b) using the calculated coefficients in at least a subset of the plurality of polynomial equations to determine the values of the operational characteristics for the mechanical system functioning with multiple combinations of the plurality of devices operating at each speed from the set of the plurality of speeds and where each characteristic curve corresponds to a respective device of the plurality of devices functioning at a given speed, the plurality of devices including a plurality of device types;

selecting a given operating scenario of the plurality based on the predicted efficiency of each of the plurality of operating scenarios, the selected operating scenario including a number of devices of the plurality of devices and an indication of which device types to operate of the plurality of device types; and controlling the mechanical system in accordance with the selected operating scenario.

* * * * *